(12) United States Patent
Iwata et al.

(10) Patent No.: US 9,035,263 B2
(45) Date of Patent: May 19, 2015

(54) RADIATION IMAGING APPARATUS HAVING AN ANTI-STATIC FUNCTION

(71) Applicants: Yukino Iwata, Tokyo (JP); Shinichi Okamura, Tokyo (JP)

(72) Inventors: Yukino Iwata, Tokyo (JP); Shinichi Okamura, Tokyo (JP)

(73) Assignee: KONICA MINOLTA MEDICAL & GRAPHIC, INC., Tokyo (JP)

( * ) Notice: Subject to any disclaimer, the term of this patent is extended or adjusted under 35 U.S.C. 154(b) by 289 days.

(21) Appl. No.: 13/655,097

(22) Filed: Oct. 18, 2012

(65) Prior Publication Data

US 2013/0099126 A1 Apr. 25, 2013

(30) Foreign Application Priority Data

Oct. 25, 2011 (JP) ................................. 2011-233478

(51) Int. Cl.
*G01T 1/20* (2006.01)

(52) U.S. Cl.
CPC .................... *G01T 1/2018* (2013.01)

(58) Field of Classification Search
CPC ..................................................... G01T 1/2018
USPC ........................................... 250/366, 370.09
See application file for complete search history.

(56) References Cited

U.S. PATENT DOCUMENTS

| 5,658,677 | A | * | 8/1997 | Ebisch et al. | 428/537.5 |
| 6,806,473 | B2 | * | 10/2004 | Honda et al. | 250/370.11 |
| 2005/0258425 | A1 | * | 11/2005 | Izumi | 257/72 |
| 2006/0249709 | A1 | * | 11/2006 | Nakamura | 252/301.4 F |

FOREIGN PATENT DOCUMENTS

| JP | 06-342099 | 12/1994 |
| JP | 09-073144 | 3/1997 |
| JP | 2006-058124 | 3/2006 |
| JP | 2010-019620 | 1/2010 |
| JP | 2011-058999 | 3/2011 |

* cited by examiner

*Primary Examiner* — David Porta
*Assistant Examiner* — Mindy Vu
(74) *Attorney, Agent, or Firm* — Lucas & Mercanti, LLP

(57) ABSTRACT

A radiation image imaging apparatus includes: a sensor board in which a plurality of photoelectric conversion elements are arranged two-dimensionally; and a scintillator which converts an incident radiation into light and irradiates the light onto the photoelectric conversion elements, and a protection layer having an anti-static function is provided between the sensor board and the scintillator, and an anti-static layer having conductivity or an anti-static function is provided on a surface of the sensor board, the surface being opposite with a side facing the scintillator.

9 Claims, 15 Drawing Sheets

FIG. 9
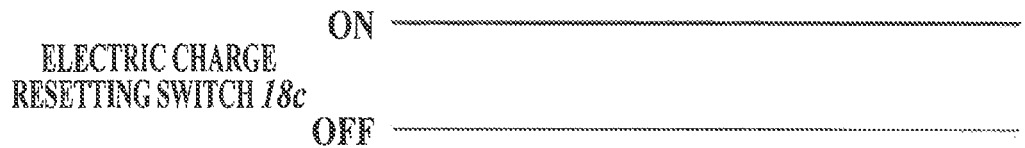
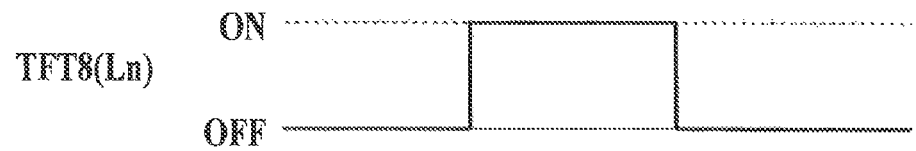
FIG. 10
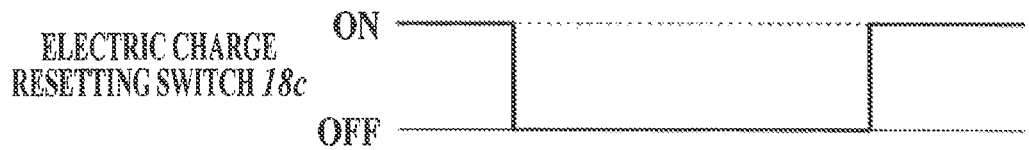
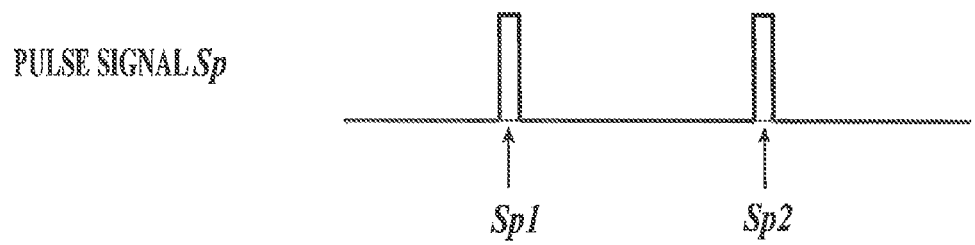
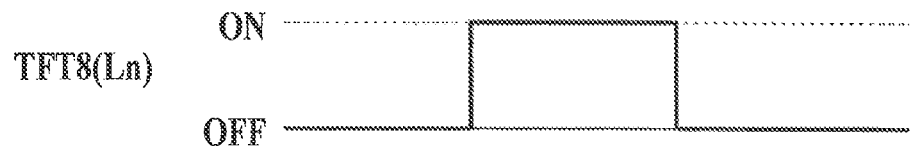

RADIATION IMAGING APPARATUS HAVING AN ANTI-STATIC FUNCTION

CROSS-REFERENCE TO RELATED APPLICATION

The present U.S. patent application claims a priority under the Paris Convention of Japanese patent application No 2011-233478 filed on Oct. 25, 2011, which shall be a basis of correction of an incorrect translation, and is incorporated by reference herein.

BACKGROUND OF THE INVENTION

1. Field of the Invention

The present invention relates to a radiation image imaging apparatus, and particularly, to a radiation image imaging apparatus that converts an irradiated radiation into image data, and reads out the image data.

2. Description of the Related Art

There have been developed a variety of radiation image imaging apparatuses, each of which converts an irradiated radiation such as an X-ray into other-wavelength light such as visible light by a scintillator, thereafter, generates electric charges in a photoelectric conversion element such as a photodiode in response to energy of the converted and irradiated light, and coverts the radiation into an electric signal (that is, image data).

This type of radiation image imaging apparatus is known as a flat panel detector (FPD), and heretofore, has been composed as a so-called dedicated type (also referred to as a fixed type) (for example, refer to Japanese Patent Application Laid-Open Publication No. H09-73144 (published in 1997)), which iis formed integrally with a supporting base. However, in recent years, a portable-type radiation image imaging apparatus, which has a photoelectric conversion element and the like housed in a cabinet thereof and is made portable, has been developed and put into practical use (for example, refer to Japanese Patent Application Laid-Open Publication No. 2006-058124 and Japanese Patent Application Laid-Open Publication H06-342099 (published in 1994).

In usual, the radiation image imaging apparatus is composed in such a manner that a plurality of photoelectric conversion elements are arrayed in a two-dimensional shape (matrix shape) on a sensor board, and that switch units formed of thin film transistors (hereinafter, referred to as TFTs) and the like are individually connected to the respective photoelectric conversion elements. The switch units are individually connected to scan lines, turn to an OFF state when being applied with an OFF voltage from the scan lines, and accumulate electric charges in the photoelectric conversion element. Moreover, when being applied with an ON voltage from the scan lines, the switch units discharge the electric charges accumulated in the photoelectric conversion element.

Then, in usual, radiation image imaging is performed in such a manner that the radiation is irradiated onto the radiation image imaging apparatus from a radiation source of a radiation generation apparatus in a state of transmitting through a predetermined imaging target region (that is, a front surface of a breast, a side surface of a lumbar, or the like) of a body of subject, or the like. During the irradiation of the radiation, the switch units of the photoelectric conversion elements are turned to the OFF state, the irradiated radiation is converted into light by the scintillator, the converted light is irradiated onto the photoelectric conversion element, and electric charges generated in the photoelectric conversion elements by the irradiation of the light (that is, the irradiation of the radiation) are accumulated in the photoelectric conversion elements.

Then, when the ON voltage is applied from the scan lines to the switch units, the electric charges accumulated in the photoelectric conversion elements are sequentially discharged to signal lines, and the electric charges are converted into image data D by a reading circuit connected to the signal lines, and the respective pieces of the image data 13 are individually read out. In usual the radiation image imaging apparatus is configured so as to perform reading processing as described above.

Incidentally, it is known that, when impacts and vibrations are applied from the outside to the radiation image imaging apparatus in the event of the reading processing for the image data D, or the like, which is as described above, then in some case, a relatively large noise is superimposed on the image data D, which are read out from the respective photoelectric conversion elements, and image quality is deteriorated. Then, though a cause that the noise as described above occurs is not always clearly turned out, the cause is conceived to result from static electricity generated on the periphery of the sensor board on which the respective photoelectric conversion elements are formed.

Accordingly, for the purpose of preventing such a phenomenon from occurring, for example, Japanese Patent Application Laid-Open Publication No. 2010-19620 proposes that an anti-static layer is provided between the sensor board and the scintillator. This is a measure for preventing an occurrence of a so-called image defect since the photoelectric conversion elements are broken owing to the static electricity to be generated in the case of pasting things with a relatively large area, such as the sensor board and the scintillator, onto each other, or peeling off these things from each other. In the case of providing the anti-static layer as described above, it becomes possible to suppress the occurrence of the static electricity at least in comparison with the case of not providing the anti-static layer, and it becomes possible to reduce an occurrence of the image defect.

Therefore, it is conceived that use of such a technology is useful also for preventing an occurrence of the above-described phenomenon that the noise is superimposed on the image data D, which are to be read out, when the impacts and the vibrations are applied to the radiation image imaging apparatus in a state where the static electricity is generated on the periphery of the sensor board.

Moreover, for example, Japanese Patent Application Laid-Open Publication No. 2011-58999 illustrates a configuration in which a radiation shielding sheet, a heat insulating sheet, a conductive shield member and an electric processing unit are arranged in this order on a surface side of the sensor board, which is opposite with the scintillator. This is a configuration for preventing the noise, which occurs on one side, from transmitting to other side in such a manner that such an electric noise, which occurs on the sensor board side and the electric processing unit side, is shielded and received by the shield member, and is let go through a shield finger to a cabinet, and so on.

However, in accordance with researches of the inventors of the present invention, it is gradually understood that, in some cases, there cannot be sufficiently prevented the occurrence of the above-described phenomenon that the noise is superimposed on the image data D at least by the fact that the impacts and the vibrations are applied to the radiation image imaging apparatus if the anti-static layer is only provided between the sensor board and the scintillator, for example, as described in Japanese Patent Application Laid-Open Publication No. 2010-19620.

Moreover, it is gradually understood that the occurrence of the static electricity cannot be always prevented sufficiently even if such a configuration as described in Japanese Patent Application Laid-Open Publication No. 2011-58999 described above is adopted, and in some case, the occurrence of the phenomenon that the noise is superimposed on the image data D at least by the fact that the impacts and the vibrations are applied to the radiation image imaging apparatus cannot be surely prevented.

Moreover, the following is gradually understood. Specifically, also in the case of adopting a configuration so that start of the radiation irradiation can be detected by the radiation image imaging apparatus itself without depending on a signal from the radiation generation apparatus side that irradiates the radiation onto the radiation image imaging apparatus concerned, in the case where the impacts and the vibrations are applied to the radiation image imaging apparatus when the static electricity is generated on the periphery of the sensor board in the event of detection processing of the start of the radiation irradiation, the start of the radiation irradiation is sometimes detected erroneously.

SUMMARY OF THE INVENTION

The present invention has been made in consideration of the above-described problems. It is an object of the present invention to provide a radiation image imaging apparatus which, even if being applied with the impacts and the vibrations, is capable of accurately preventing the noise from being superimposed on the image data and the like, which are to be read out, in such a manner that the static electricity is prevented from occurring on the periphery of the sensor board, or that the static electricity is effectively removed even if the static electricity is generated.

Further, it is another object of the present invention to provide a radiation image imaging apparatus capable of accurately preventing an occurrence of the erroneous detection of the start of the radiation irradiation, which is caused by the fact that the impacts and the vibrations are applied to the radiation image imaging apparatus, in the case of detecting the start of the radiation irradiation by the radiation image imaging apparatus itself.

To achieve at least one of the abovementioned objects, a radiation image imaging apparatus, reflecting one aspect of the present invention, includes:

a sensor board, including a plurality of scan lines, a plurality of signal lines and a plurality of photoelectric conversion elements, the plurality of scan lines and the plurality of signal lines being arranged to intersect each other, and the plurality of photoelectric conversion elements being arranged two-dimensionally in respective small regions partitioned by the plurality of scan lines and the plurality of signal lines;

a scintillator which converts an incident radiation into light and irradiates the light onto the photoelectric conversion elements;

a scan drive unit which sequentially applies an ON voltage to the respective scan lines while switching the respective scan lines to be applied with the ON voltage;

switch units which are connected to the respective scan lines, accumulate electric charges in the photoelectric conversion elements upon being applied with an OFF voltage, and discharge the electric charges to the signal lines upon being applied with the ON voltage, the electric charges being accumulated in the photoelectric conversion, elements;

a reading circuit which is connected to the signal lines, coverts the electric charges into image data, the electric charges being discharged from the photoelectric conversion elements, and reads out the image data; and a control unit which controls at least the scan drive unit and the reading circuit to perform reading processing for the image data from the photoelectric conversion elements, and a protection layer having an anti-static function is provided between the sensor board and the scintillator, and an anti-static layer having conductivity or an anti-static function is provided on a surface of the sensor board, the surface being opposite with a side facing the scintillator.

BRIEF DESCRIPTION OF THE DRAWINGS

The present invention will be more fully understood by the following detailed description and the accompanying drawings. However, these are not intended to limit the present invention, wherein:

FIG. 6 is a side view explaining the sensor board attached with a flexible circuit board, a PCB board and the like;

FIG. 9 is a timing chart showing ON/OFF timing of an electric charge resetting switch and the TFT in reset processing for each photoelectric conversion element;

FIG. 10 is a timing chart showing ON/OFF timing of the electric charge resetting switch, a pulse signal and the TFT in reading processing for image data;

PREFERRED EMBODIMENTS OF THE PRESENT INVENTION

A description is made of embodiments of a radiation image imaging apparatus according to the present invention with reference to the drawings.

Figure 1:
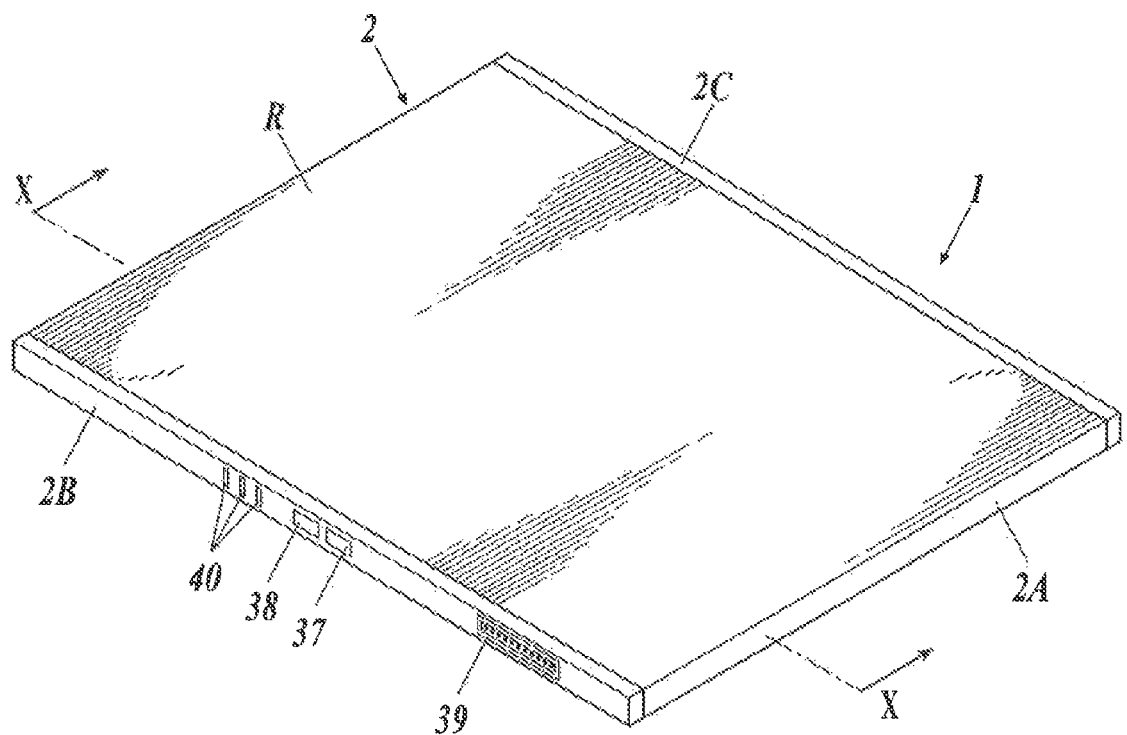
FIG. 1 is a perspective view showing an exterior appearance of a radiation image imaging apparatus according to this embodiment.
Figure 2:
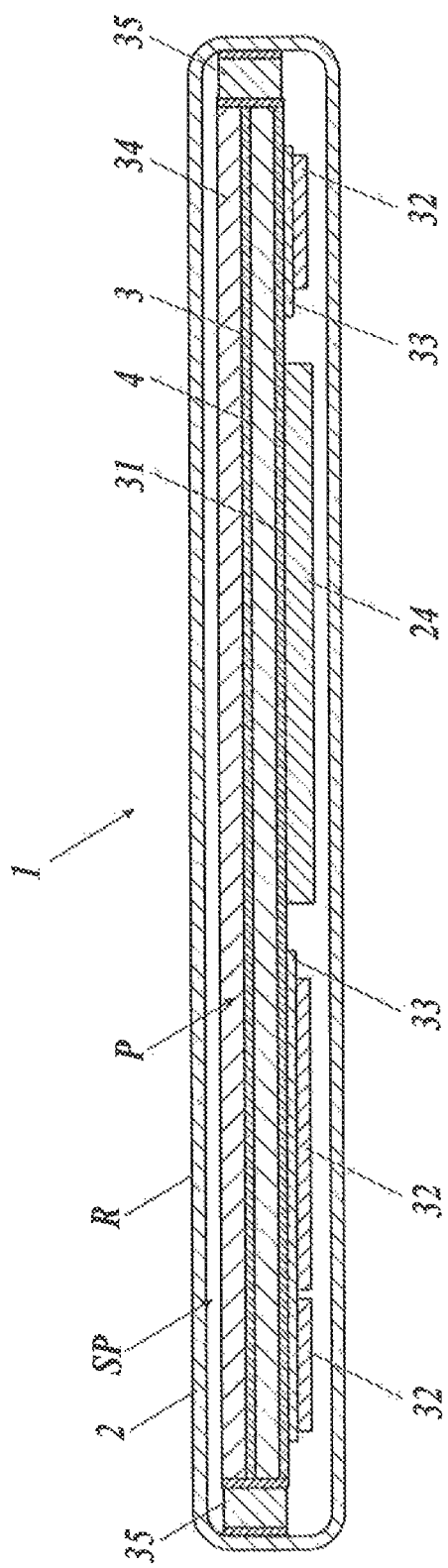
FIG. 2 is a cross-sectional view along a line X-X in FIG. 1.

Note that a description is made below of the case where the radiation image imaging apparatus is a portable-type radiation image imaging apparatus in which photoelectric conversion elements and the like are housed in a cabinet; however, the present invention can also be applied to a dedicated-type (fixed-type) radiation image imaging apparatus formed integrally with a support stage First, a description is made of a schematic configuration of a radiation image imaging apparatus 1 according to this embodiment FIG. 1 is a perspective view showing an exterior appearance of a radiation image imaging apparatus according to this embodiment, and FIG. 2 is a cross-sectional view along a line X-X of FIG. 1. As shown in FIG. 1 and FIG. 2, in the radiation image imaging apparatus 1, a sensor panel SP composed of a scintillator 3, a sensor board 4 and the like is housed in a cabinet 2.

In this embodiment, in the cabinet 2, a hollow and square-cylindrical cabinet body portion 2A thereof, which has a radiation incident surface R, is formed of a material such as a carbon plate and plastics, which transmits a radiation therethrough, and opening portions on both sides of the cabinet body portion 2A are closed by cap members 2B and 2c, whereby the cabinet 2 is formed, Moreover, on the cap member 2B on one side of the cabinet 2, there are arranged: a power supply switch 37; a switching switch 38; a connector 39; an indicator 40 composed of LEDs which display a battery state, an operation state of the radiation image imaging apparatus 1, and the like; and the like.

Figure 3:
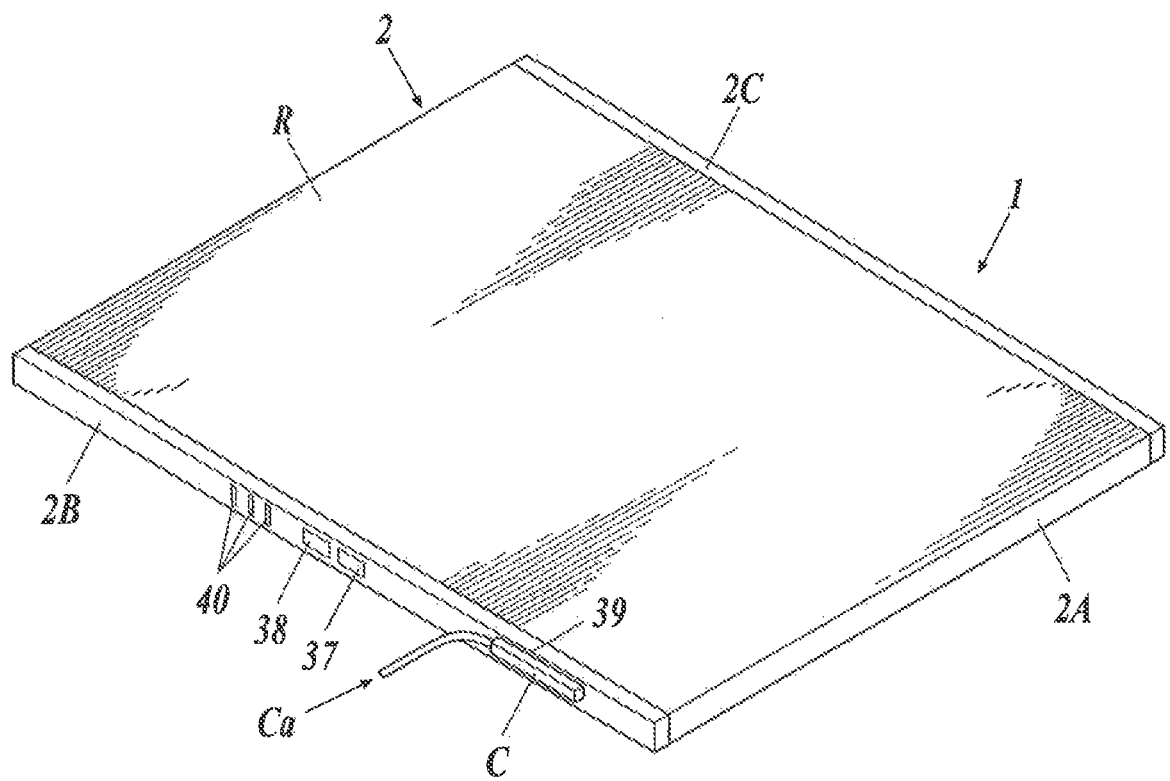
FIG. 3 is a perspective view showing a state where a connector of a cable is connected to the radiation image imaging apparatus.

In this embodiment, for example, as shown in FIG. 3, a connector C provided on a tip end of a cable Ca is connected to the connector 39, whereby the connector 39 functions as a wired communication unit, for example, in the event of transmitting/receiving a signal and the like to/from an external apparatus through the cable Ca and transmitting image data P thereto.

Moreover, though not shown, for example, on the cap member 2C on an opposite side of the cabinet 2, or the like, an antenna apparatus 41 is provided, for example, by being embedded in the cap member 2C, and so on, and in this embodiment, this antenna apparatus 41 functions as a communication unit in the case of wirelessly transmitting/receiving a signal and the like between the radiation image imaging apparatus 1 and an external apparatus.

As shown in FIG. 2, in an inside of the cabinet 2, a base stage 31 is arranged below the sensor board 4 through a thin lead plate (not shown) and the like. Onto the base stage 31, a PCB board 33, on which electronic components 32 and the like are arranged, a battery 24 and the like are attached. Moreover, on the radiation incident surface side of each of the sensor board 4 and the scintillator 3, a scintillator substrate 34 for protecting these is arranged.

Note that other configurations of this portion will be described later in detail. Moreover, in this embodiment, between the sensor panel SP and a side surface of the cabinet 2, a buffer material 35 for preventing these from hitting each other is provided.

The scintillator 3 is provided at a position opposite to a detection portion P of the sensor board 4, which will be described later. In this embodiment, for example, as the scintillator 3, one is used, which contains a fluorescent material as a main component, and upon receiving incidence of the radiation, converts the radiation into an electromagnetic wave with a wavelength of 300 to 800 nm, that is, light in which visible light is centered, and then outputs the light concerned.

Figure 11:
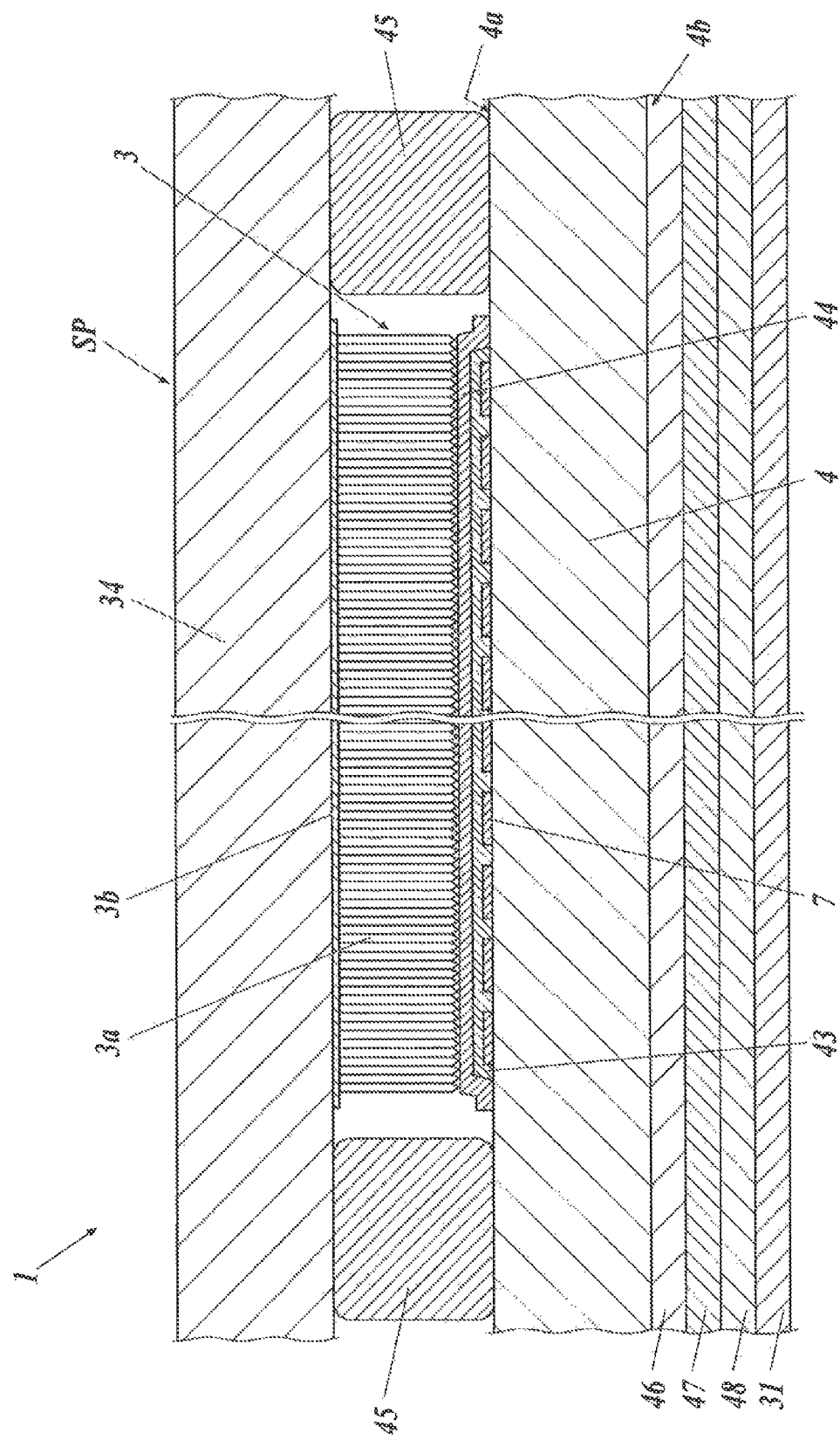
FIG. 11 is an enlarged cross-sectional view of a sensor panel portion of the radiation image imaging apparatus according to this embodiment.

The scintillator 3 has a layer of fluorescent materials 3a (refer to FIG. 11 to be described later) on a support body (not show) to be pasted onto the scintillator substrate 34. Here, a mode in which an undercoat layer (not shown) is provided between the support body and such a fluorescent material layer. Moreover, as shown in FIG. 11 to be described later, and the like, the scintillator 3 may be composed of a reflection layer, the undercoat layer and the layer of the fluorescent materials 3a by providing the reflection layer 3b on the support body. A description is made below of the respective constituent layers, the respective constituent elements, and the like As the fluorescent material that forms the layer of the fluorescent materials 3a, a variety of publicly known fluorescent materials can be used; however, cesium iodide (CsI) is preferably used since a change rate thereof from an X-ray to the visible light is relatively high, the fluorescent materials 3a can be easily formed into a columnar crystal structure by vapor deposition thereof, scattering of emitted light in such crystals is suppressed by a light guide effect thereof, and a thickness of the layer of the fluorescent materials 3a can be thickened.

However, high light emitting efficiency cannot be achieved by CsI alone, and accordingly, CsI is used by adding a variety of activators thereto. For example, as described in Japanese Examined Patent Application Publication No S54-35060 (published in 1979), a mixture is mentioned, which is obtained by mixing Cal and sodium iodide (NaI) with each other in an arbitrary molar ratio. Moreover, for example, CsI as disclosed in Japanese Patent Application Laid-Open Publication No, 2001-59899 is preferable, which is formed by vapor deposition, and contains an activator such as thallium (TI), europium (Eu), indium (In), lithium (Li), potassium (K) rubidium (Rb) and sodium (Na) Among them, thallium (Ti) and europium (Eu) are preferable, and thallium (Ti) is particularly preferable.

Moreover, preferably, the layer of the fluorescent materials 3a containing cesium iodide (CsI) is formed by using, as raw materials, cesium iodide and an additive particularly containing one or more types of thallium compounds. That is to say, thallium-activated cesium iodide (CsI: Tl) is preferable since a wide light emitting wavelength ranging from 400 nm to 750 nm is inherent therein.

As the one or more types of thallium compounds contained in the additive, a variety of thallium compounds (compounds with oxidation numbers of +I and +III) can be used. A preferable thallium compound is thallium iodide (TII), thallium bromide (TlBr), thallium chloride (TlCl), thallium fluoride (TlF, TlF3) or the like. A melting point of the thallium compound is preferably within a range of 400 to 700° C. in terms of the light emitting efficiency. Note that the melting point here is a melting point under the normal pressure.

As a method to add the additive compounds to CsI, a method to evaporate these additive compounds with CsI at the same time and to deposit the evaporated compounds on a substrate in a deposition apparatus may be applied. In this case, iodide such as sodium iodide (NaI), thallium iodide (TlI), indium iodide (InI) may preferably be used as activators so that growth of CsI columnar crystal would not be inhibited.

Further, after the Cal columnar crystal is formed on the substrate by vapor deposition, a method to place CsI with activator compounds such as sodium compounds, thallium compounds, indium compounds in a sealed space; to heat the activator compounds up to a sublimation temperature or higher; and to activate the CsI may also be applied. In this case, CsI formed on the substrate placed in the sealed space may preferably be heated to a temperature ranging from 100 to 350° C. Further, the compounds to be used as the activator is not particularly limited, although compounds which have low sublimation temperature may preferably be used. Especially, activation by sublimation of europium compounds is effective in reducing time of afterglow.

In the layer of the fluorescent materials 3a according to this embodiment, desirably, a content of the additive concerned be set at an optimum amount in response to an object, performance and the like. Preferably, the content concerned be 0.001 mol to 50 mol %, and moreover, 0.1 mol % to 10.0 mol % with respect to a content of cesium iodide in terms of holding light emitting brightness and property/function of cesium iodide Note that, preferably, the thickness of the layer of the fluorescent materials 3a be 50 to 600 μm, and in the case where a resin film is used as the support body, preferably, the thickness concerned is 50 to 500 μm in terms of damage of the fluorescent material at the time of cutting. Moreover, for medical use, more preferably, the thickness concerned is 120 to 400 μm in terms of a characteristic balance between brightness and sharpness.

Any cutting method among general cutting methods may be applied for cutting the scintillator 3, although cutting the scintillator 3 by using a clicking machine, or by laser cutting, and the like, may be preferable in terms of operation and accuracy.

Moreover, as shown in FIG. 11 to be described later, and the like, preferably, the reflection layer 3b is provided on the support body. The reflection layer 3b is a layer for enhancing light extraction efficiency by reflecting the light emitted from the fluorescent materials 3a (that is, the scintillator 3). Preferably, the reflection layer 3b concerned is formed of a material containing any element selected from among an element group consisting of Al, Ag, Cr, Cu, Ni, Ti, Mg, Rh, Pt and Au Particularly preferably, a metal thin film composed of any of the above-described elements, for example, an Ag film, an Al film or the like is used. Moreover, two layers or more of the metal thin films as described above may be formed. Note that a thickness of the reflection layer is preferably 0.005 to 0.3 μm, more preferably 0.01 to 0.2 μm from a viewpoint of the light extraction efficiency for the emitted light. Moreover, the reflection layer 3b may be formed by coating a liquid containing light-scattering fine particles of titanium oxide, barium sulfate, silicon dioxide, aluminum oxide or the like and acrylic-based, silicon-based, epoxy-based, polyvinyl acetal-based, polyester-based or polyurethane-based binder resin. The reflection layer 3b may also be formed by coating paint containing white pigment and the binder resin. Especially, as the binder resin, polyester-based or polyurethane-based hydrophobic resin is preferable for its adhesion property.

In this embodiment, preferably, the undercoat layer (not shown) is provided between the support body and the layer of the fluorescent materials 3a or between the reflection layer 3b and the layer of the fluorescent materials 3a, As a manufacturing method of the undercoat layer concerned, there are a method of depositing a polyparaxylylene film by a chemical vapor deposition method (CVD method) and a method using a polymer binding material (binder), and the method using the Polymer binding material (binder) is more preferable from a viewpoint of film adherence. In this polymer binding material (binder), preferably, a glass transition point thereof ranges from 30 to 100° C. in terms of film adherence between such vapor-deposited crystals and the board. Specifically, as the binder, there are mentioned polyurethane resin, a vinyl chloride copolymer, a vinyl chloride-vinyl acetate copolymer, a vinyl chloride-vinylidene chloride copolymer, a vinyl chloride-acrylonitrile copolymer, a butadiene-acrylonitrile copolymer, polyamide resin, polyvinyl butyral, polyester resin, a cellulose derivative (nitrocellulose or the like), a styrene-butadiene copolymer, a variety of synthetic rubber-based resins, phenol resin, epoxy resin, urea resin, melamine resin, phenoxy resin, silicon resin, acrylic-based resin, urea formamide resin, and the like. In particular, preferably, the binder is polyester resin. Moreover, preferably, a thickness of the undercoat layer ranges from 0.5 to 4 μm in terms of sharpness, proofness against an occurrence of columnar crystal turbulence, and the like.

Moreover, as the support body (not shown) according to this embodiment, a variety of materials can be used. As the support body, there are mentioned: a support body composed of a material containing carbon, aluminum and glass as main components; a support body composed of polymer resin such as polyimide, cellulose acetate, polyester, polyethylene terephthalate, polyethylene naphthalate, polyamide, triacetate and polycarbonate.

Further, as the support body, a bionanofiber film which has properties of flexibility, resistance to heat expansion, and high intensity, may be used. A bionanofiber is a material that is light, has intensity five times or more compared to that of iron, and is resistant to heat expansion, so that it may be applied to various usages, such as mixing, coating, and forming into a film. This material is advantageous in terms of environmental aspects in that it is capable of being burnt due to being made of plant fiber.

Further, the support body may be colored, and is preferably a resin film in which pigment is mixed. Especially, a support body being formed from a resin film including light scattering particles such as titanic oxide, barium sulfate, and the like, is preferable in that the support body may also function as a reflection layer.

Figure 4:
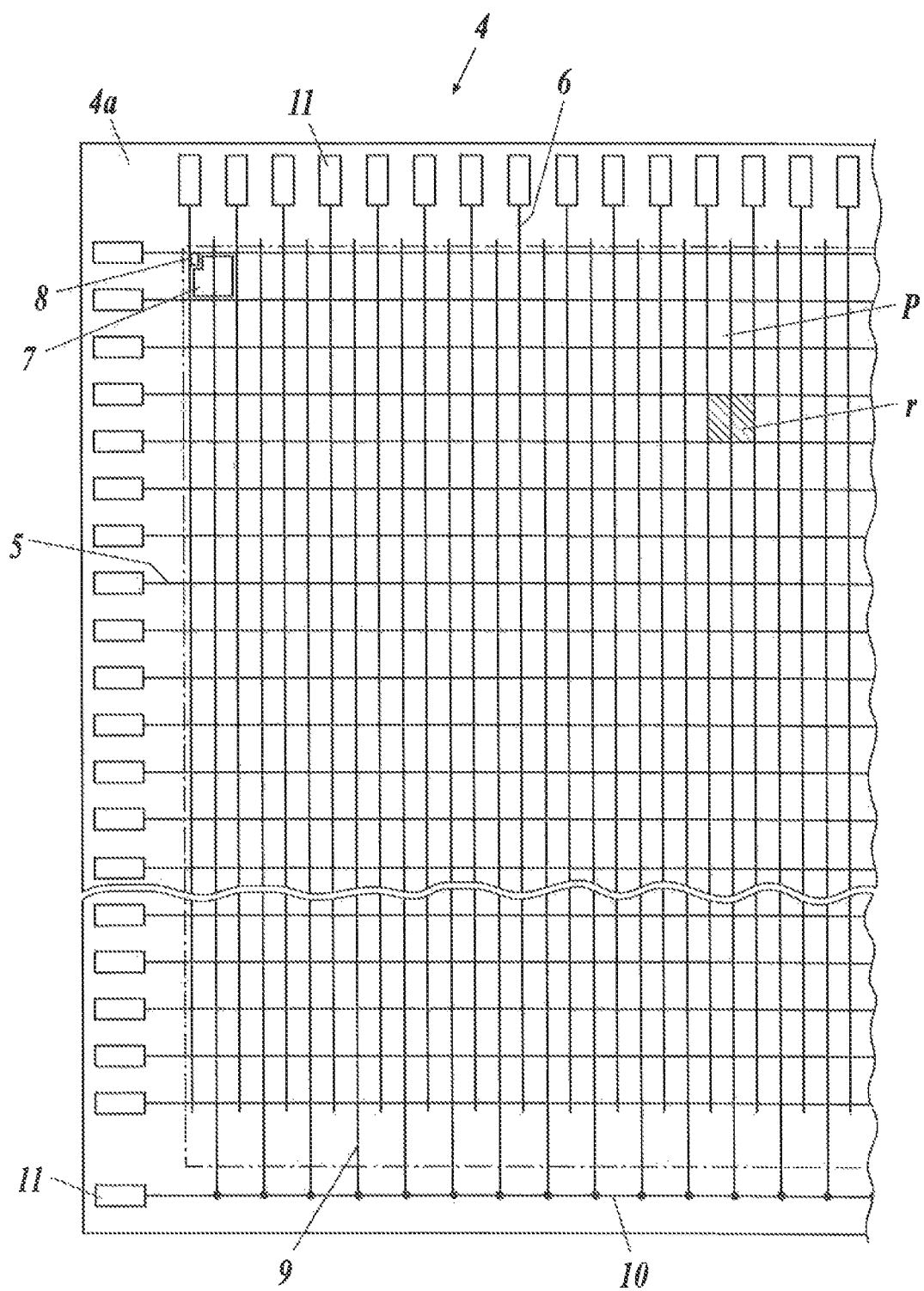
FIG. 4 is a plan view showing a configuration of a sensor board of the radiation image imaging apparatus.

Meanwhile, in this embodiment, the sensor board 4 is composed of a glass substrate, and as shown in FIG. 4, on a surface 4a (hereinafter, referred to as a front surface 4a) of the sensor board 4, which is opposite to the scintillator 3, a plurality of scan lines 5 and a plurality of signal lines 6 are arranged so as to intersect each other.

On each of small regions r partitioned by the plurality of scan lines 5 and the plurality of signal lines 6 on the front surface 4a of the sensor board 4a photoelectric conversion element 7 is individually provided. As described above, the whole of the small regions r, on which the plurality of photoelectric conversion elements 7 arranged two-dimensionally on the respective small regions r partitioned by the scan lines 5 and the signal lines 6 are provided, that is, a region shown by an alternate long and short dashed line in FIG. 4 is defined as a detection unit P.

Figure 5:
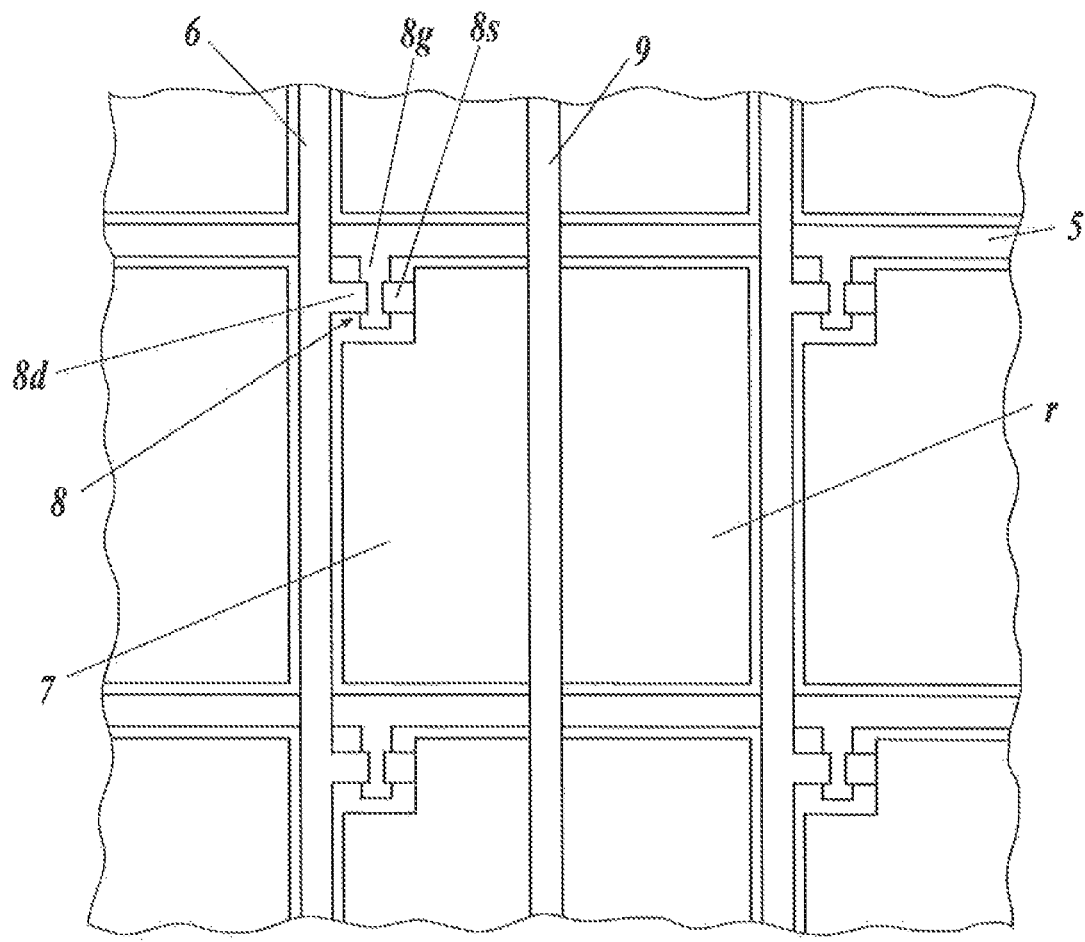
FIG. 5 is an enlarged view showing configurations of a photoelectric conversion element, a TFT and the like, which are formed on a small region of the sensor board of FIG. 4.

In this embodiment, a photodiode is used as each of the photoelectric conversion elements 7, and besides, for example, a phototransistor or the like is also usable. As shown in FIG. 5 as an enlarged view of FIG. 4, each of the photoelectric conversion elements 7 is connected to a source electrode 8s of a TFT 8 as a switch unit, Moreover, a drain electrode 8d of the TFT 8 is connected to the signal line 6.

When the radiation is incident from the radiation incident surface R of the cabinet 2 of the radiation image imaging apparatus 1, and the light such as the visible light converted from the radiation by the scintillator 3 is irradiated onto the photoelectric conversion element 7, the photoelectric conversion, element 7 generates electron/hole pairs in an inside thereof. In such a way, the photoelectric conversion element 7 converts the irradiated radiation (light converted from the radiation by the scintillator 3 in this embodiment) into electric charges.

Then, when an ON voltage is applied to the gate electrode 8g through the scan line 5 from a scan drive unit 15 to be described later, the TFT 8 turns to an ON state, and discharges the electric charges, which are accumulated in the photoelectric conversion element 7, to the signal line 6 through the source electrode 8s and the drain electrode 8d. Moreover, when an OFF voltage is applied to the gate electrode 8g through the scan line 5 connected to the TFT 8, the TFT 8 turns to an OFF state, stops discharging the electric charges from the photoelectric conversion element 7 to the signal line 6, and accumulates the electric charges in the photoelectric conversion element 7.

In this embodiment, as shown in FIG. 5, one bias line 9 is connected to the plurality of photoelectric conversion elements 7 individually arranged in a column fashion, and as shown in FIG. 4, the respective bias lines 9 are individually arranged in parallel to the signal lines 6. Moreover, the respective bias lines 9 are bundled by a connection line 10 at an outside position of the detection unit P of the sensor board 4.

In this embodiment, as shown in FIG. 4, the respective scan lines 5 and the respective signal lines 6 and the connection line 10 of the bias lines 9 are individually connected to input/output terminals (also referred to as pads) 11 provided on the vicinities of end edge portions of the sensor board 4.

Figure 6:
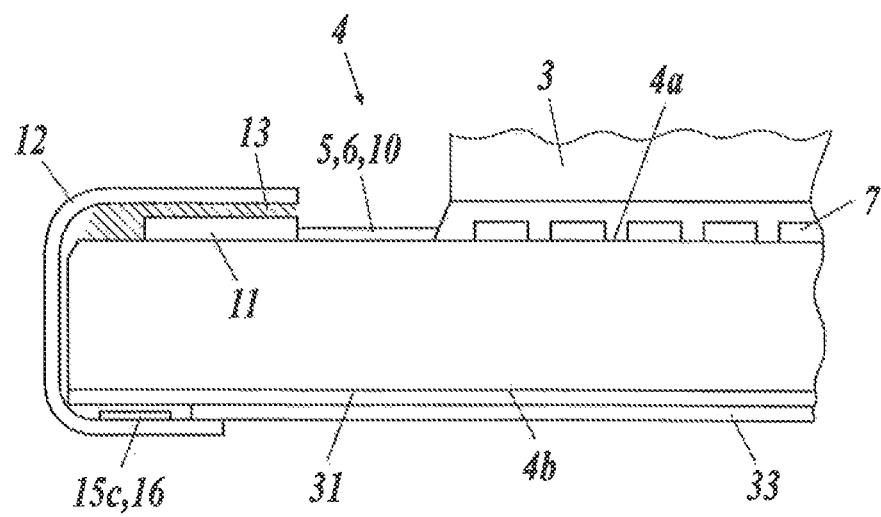

As shown in FIG. 6, to the respective input/output terminals 11, a flexible circuit board 12 is connected through an anisotropic conductive adhesive material 13 such as an anisotropic conductive film and an anisotropic conductive paste. The flexible circuit board 12 is also referred to as a "chip on film" and the like, and in the flexible circuit board 12, chips such as reading ICs 16 to be described later and as gate ICs 15c which compose a gate driver 15b of the scan drive unit 15 are incorporated onto a film.

Then, the flexible circuit board 12 is taken around to a back surface 4b side of the sensor board 4, and is connected to the above-mentioned PCB board 33 on the back surface 4b side. In such a way, the sensor panel SP of the radiation image imaging apparatus 1 is formed. Note that such a lower structure of the sensor board 4 will also be described later in detail. Moreover, in FIG. 6, illustration of the electronic components 32 and the like is omitted.

Figure 7:
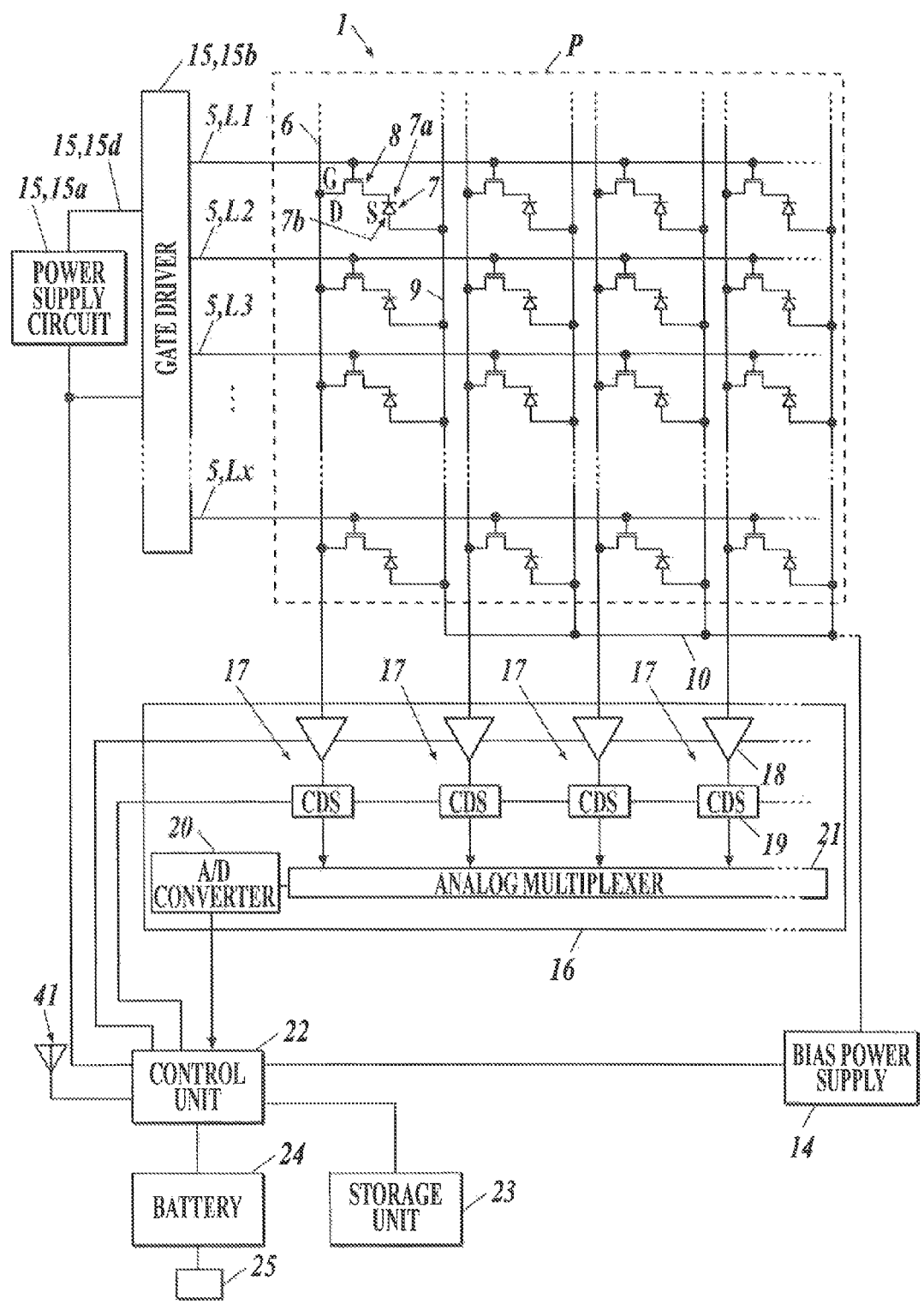
FIG. 7 is a block diagram showing an equivalent circuit of the radiation image imaging apparatus.

Here, a description is made of a circuit configuration of the radiation image imaging apparatus 1. FIG. 7 is a block diagram showing an equivalent circuit of the radiation image imaging apparatus 1 according to this embodiment, and FIG. 8 is a block diagram showing an equivalent circuit for an amount of one pixel that composes the detection unit P.

As mentioned above, in the respective photoelectric conversion elements 7 of the detection unit P of the sensor board 4, the bias lines 9 are individually connected to second electrodes 7b thereof, and the respective bias lines 9 are bundled by the connection line 10 and are connected to a bias power supply 14. The bias power supply 14 applies a bias voltage individually to the second electrodes 7b of the respective photoelectric conversion elements 7 through the connection line 10 and the respective bias lines 9.

Moreover, the bias power supply 14 is connected to a control unit 22 to be described later, and by the control unit 22, the bias voltage to be applied from the bias power supply 14 to the respective photoelectric conversion elements 7 is controlled.

Figure 8:
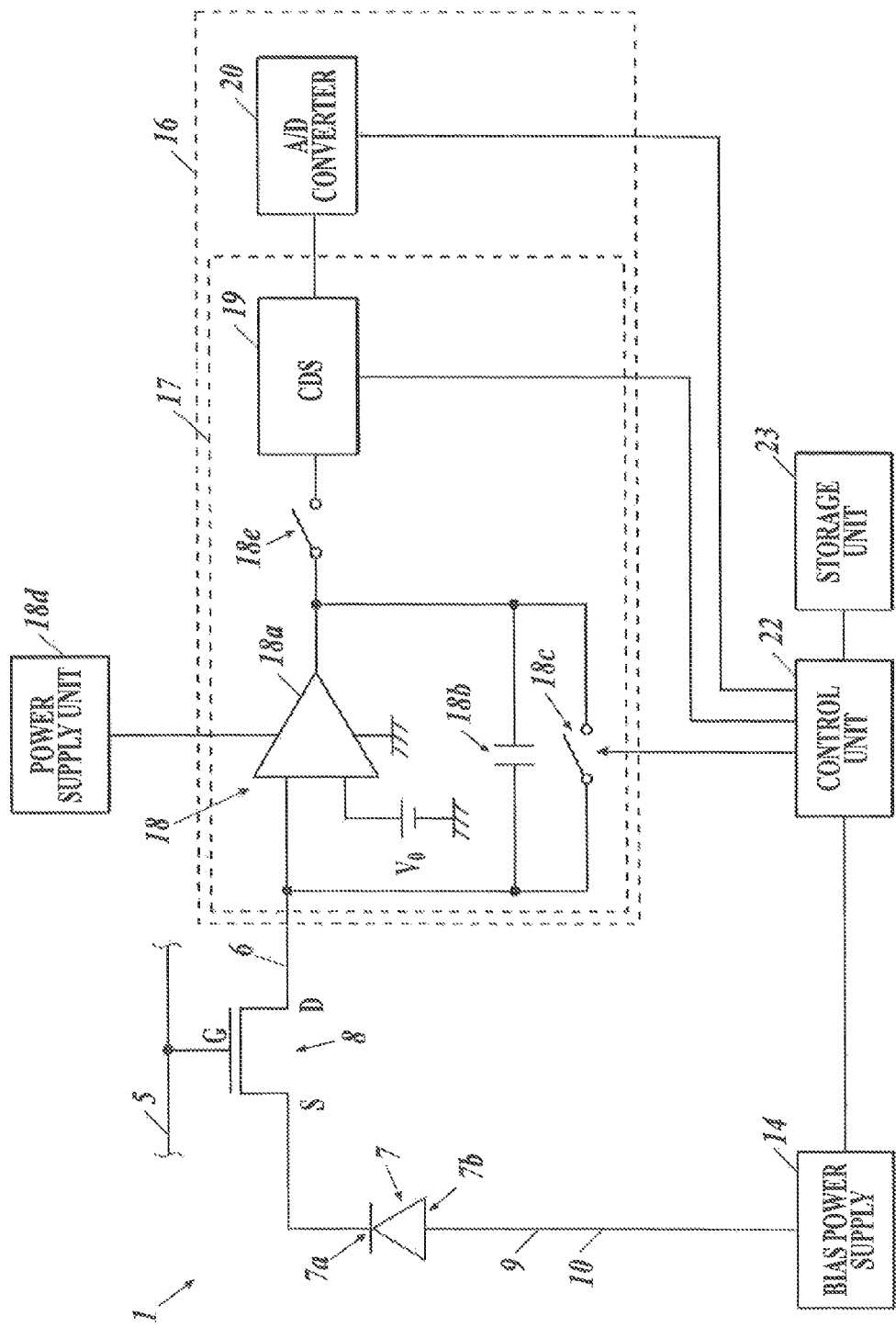
FIG. 8 is a block diagram showing an equivalent circuit for an amount of one pixel that composes a detection unit.

As shown in FIG. 7 and FIG. 8 in this embodiment, as the bias voltage, a voltage (that is, a so-called reverse bias voltage) equal to or less than a voltage to be applied to a first electrode 7a side of the photoelectric conversion elements 7 is applied from the bias power supply 14 through the bias lines 9 to the second electrodes 7b of the photoelectric conversion elements 7.

The scan drive unit 15 includes: a power supply circuit 15a that supplies the ON voltage and the OFF voltage to the gate driver 15b through a wire 15d; and the gate driver 15b that switches each of voltages to be applied to the respective lines L1 to Lx of the scan lines 5 between the ON voltage and the OFF voltage, and switches a state of each of the TFTs 8 between the ON state and the OFF state. In this embodiment, the gate driver 15d is composed in such a manner that the plurality of above-mentioned gate ICs 15c (refer to FIG. 6) are provided in parallel to one another.

As shown in FIG. 7 and FIG. 8, the respective signal lines 6 are individually connected to the respective reading circuits 17 built in a reading IC 16. Each of the reading circuits 17 is composed of an amplifier circuit 18, a correlated double sampling circuit 19 and the like. In the reading IC 16, an analog multiplexer 21 and an A/D converter 20 are further provided, Note that, in FIG. 7 and FIG. 8, the correlated double sampling circuit 19 is represented as CDS. Moreover, the analog multiplexer 21 is omitted in FIG. 8.

In this embodiment, the amplifier circuit 18 is composed of: an operational amplifier 18a; and a power supply unit 18d, which has a capacitor 18b and an electric charge resetting switch 18c individually connected in parallel to the operational amplifier 18a, and supplies electric power to the operational amplifier 18a and the like. The signal line 6 is connected to an input-side inversion input terminal of the operational amplifier 18a of the amplifier circuit 18, and a reference potential $V_0$ is applied to an input-side non-inversion input terminal of the amplifier circuit 18. Note that the reference potential $V_0$ is set at an appropriate value, and in this embodiment, for example, 0 [V] is applied.

Moreover, the electric charge resetting switch 18c of the amplifier circuit 18 is connected to the control unit 22, and ON/OFF thereof is controlled by the control unit 22. Moreover, between the operational amplifier 18a and the correlated double sampling circuit 19, a switch 18e is provided, which opens and closes in conjunction with the electric charge resetting switch 18c. The switch 18e performs ON/OFF operations in conjunction with ON/OFF operations of the electric charge resetting switch 18c.

In the radiation image imaging apparatus 1, in the event of performing reset processing for each of the photoelectric conversion elements 7 for removing the electric charges remaining in each of the photoelectric conversion elements 7 concerned, as shown in FIG. 9, each of the TFTs 8 is turned to the ON state in a state where the electric charge resetting switch 18c is tuned to the ON state (and the switch 18e is turned to the OFF state).

Then, the electric charges are discharged to the signal line 6 from each of the photoelectric conversion elements 7 through each of the TFTs 8, which is turned to the ON state, pass through the electric charge resetting switch 18c of the amplifier circuit 18, then pass through an inside of the operational amplifier 18a from an output terminal side of the operational amplifier 18a concerned, and go out from the non-inversion input terminal and are grounded, or flow out to the power supply unit 18d. In such a way, the reset processing for each of the photoelectric conversion elements 7 is performed.

Meanwhile, in the event of reading processing for the image data D from each of the photoelectric conversion elements 7, as shown in FIG. 10, in a state where the electric charge resetting switch 18c of the amplifier circuit 18 is turned to the OFF state (and the switch 18e is turned to the ON state), the ON voltage is applied to the scan line 15 from the gate driver 15b of the scan drive unit 15, and the electric charges are discharged to the signal line 6 from each of the photoelectric conversion elements 7 through each of the TFTs 8 turned to the ON state. Then, the electric charges are accumulated in the capacitor 18b of the amplifier circuit 18, Then, in the amplifier circuit 18, a voltage value, which corresponds to an amount of the electric charges accumulated in the capacitor 18b, is outputted from an output side of the operational amplifier 18a, and by the amplifier circuit 18, the electric charges, which flow out from each of the photoelectric conversion elements 7, are subjected to electric charge/voltage conversion.

When a pulse signal Sp1 (refer to FIG. 10) is transmitted from the control unit 22 before the electric charges flow out from each of the photoelectric conversion elements 7, the correlated double sampling circuit (CDS) 19 provided on an output side of the amplifier circuit holds a voltage value Vin being outputted from the amplifier circuit 18 at that point of time. When a pulse signal Sp2 is transmitted from the control unit 22 after the electric charges, which flow out from each of the photoelectric conversion elements 7, are accumulated in the capacitor 18b of the amplifier circuit 18 as described above, the correlated double sampling circuit 19 holds a voltage value Vfi being outputted from the amplifier circuit 18 at that point of time.

Upon holding the voltage value Vfi at the second pulse signal Sp2, the correlated double sampling circuit 19 calculates a voltage value difference Vfi-Vin, and outputs the calculated difference Vfi-Vin as the analog image data D to a downstream side. Then, the image data D of each of the photoelectric conversion elements 7, which are outputted from the correlated double sampling circuit 19, are sequentially transmitted to the A/D converter 20 through the analog multiplexer 21, are sequentially converted into digital image data D in the A/D converter 20. Then, the digital image data D are outputted to a storage unit 23 and are sequentially stored therein.

Then, while sequentially switching the scan lines 5 to which the ON voltage is applied from the gate driver 15b of the scan drive unit 15, the image data D are read out individually from the respective photoelectric conversion elements 7 as described above, and are sequentially stored in the storage unit 23.

Note that, when the single reading processing for the image data D is ended, the electric charge resetting switch 18c of the amplifier circuit 18 is turned to the ON state (refer to FIG. 10), and the electric charges accumulated in the capacitor 18b are discharged. Then, in a similar way to the above, the discharged electric charges pass from the output terminal side of the operational amplifier 18a through the inside of the operational amplifier 18a, go out from the non-inversion input terminal and are grounded, flow out to the power supply unit 18d, and so on, whereby the amplifier circuit 18 is reset.

The control unit 22 is composed of: a computer in which a central processing unit (CPU), a read only memory (RUM), random access memory (RAM), an input/output interface and the like, which are not shown) are connected to a bus; a field programmable gate array (FPGA); and the like. The control unit 22 may be composed of a dedicated control circuit, The control unit 22 controls operations of the respective members of the radiation image imaging apparatus 1, and the like. Moreover, as shown in FIG. 7 and the like, to the control unit 22, the storage unit 23 is connected, which is composed of a static RAM (SRAM), a synchronous DRAM (SDRAM) or the like.

Moreover, in this embodiment, to the control unit 22, the above-mentioned antenna apparatus 41 is connected, and further, a battery 24 is connected, which is for supplying electric power to the respective members such as the detection unit P, the scan drive unit 15, the reading circuits 17, the storage unit 23, and the bias power supply 14, Moreover, to the battery 24, a connection terminal 25 is attached, which is used in the event of supplying electric power to the battery 24 from a charging apparatus (not shown) and charging the battery 24.

As mentioned above, the control unit 22 controls the scan drive unit 15, the reading circuit 17 and the like to perform the reading processing for the image data D and the reset processing for the respective photoelectric conversion elements 7, and controls the bias power supply 14 to set and vary the bias voltage to be applied from the bias power supply 14 to the respective photoelectric conversion elements 7, As described above, the control unit 22 controls the operations of the respective functional units of the radiation image imaging apparatus 1.

Next, a description is made of a configuration of the portion of the sensor panel SP (refer to FIG. 2) of the radiation image imaging apparatus 1 according to this embodiment.

Figure 12:
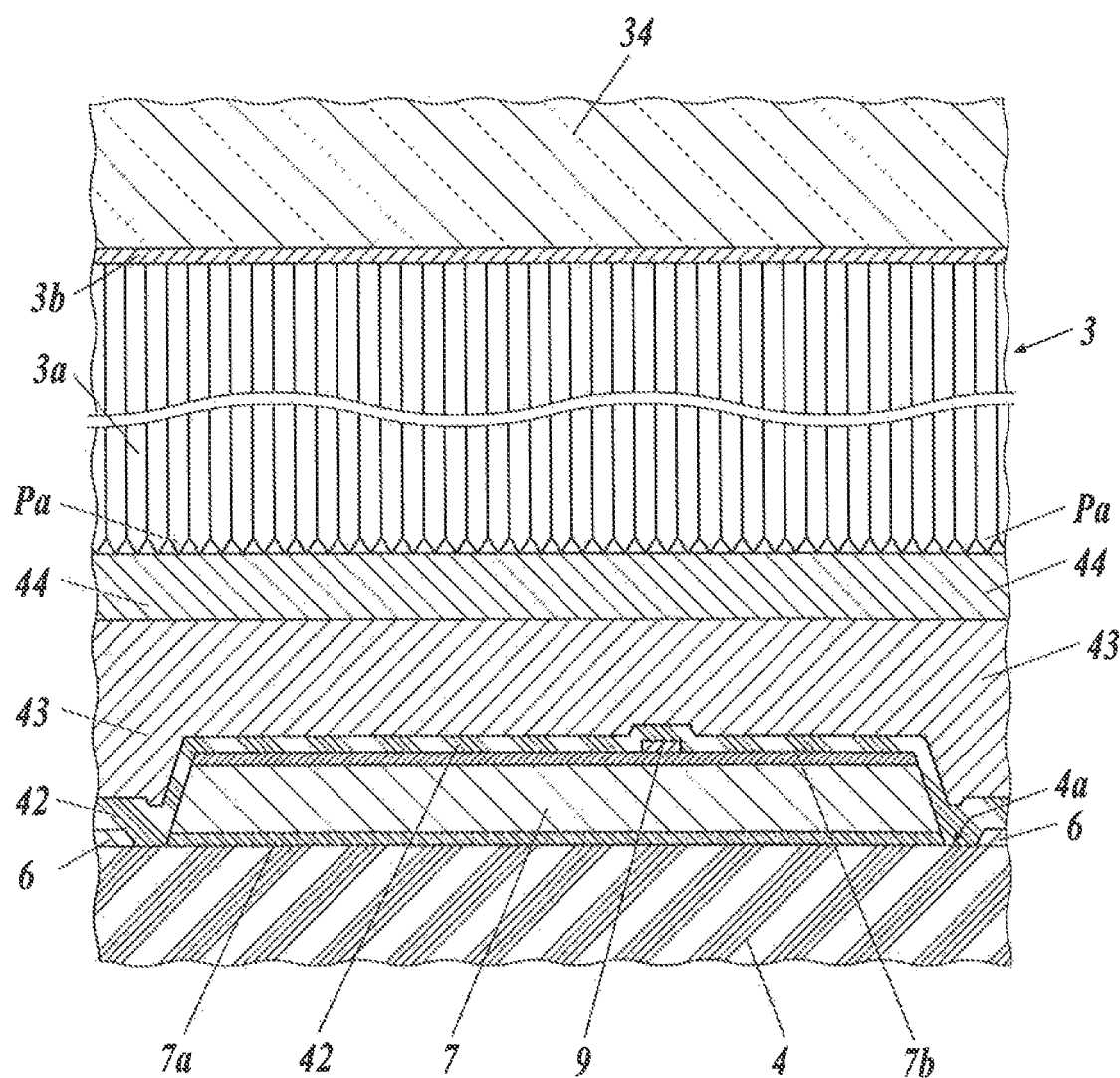
FIG. 12 is a cross-sectional view in which a portion of one photoelectric conversion element in the sensor panel of FIG. 11 is further enlarged.

FIG. 11 is an enlarged cross-sectional view of such a sensor panel portion of the radiation image imaging apparatus according to this embodiment, and FIG. 12 is a cross-sectional view in which a portion of one photoelectric conversion element in the sensor panel of FIG. 11 is further enlarged.

Note that, in FIG. 11, illustration and the like of the flexible circuit board 12 and the PCB board 33, which are shown in FIG. 6, and of the electronic components 32 such as the control unit 22 and the storage unit 23, which are formed on the PCB board 33, are omitted, and in FIG. 12, illustration of the TFTs 8 and the like is omitted. Moreover, in FIG. 11 and FIG. 12, relative sizes, thicknesses and the like of the respective members do not always reflect relative sizes, thicknesses and the like of an actual apparatus.

In this embodiment, on the sensor board 4, the photoelectric conversion elements 7 and the like are formed as described above, and in this embodiment, as shown in FIG. 12, the first electrode 7a (refer to FIG. 7, FIG. 8 and the like) of each of the photoelectric conversion elements 7 is formed on the sensor board 4 side, and moreover, the second electrode 7h of each thereof is formed on the scintillator 3 side. Then, as mentioned above, the first electrode 7a of each of the photoelectric conversion elements 7 is connected to the signal line 6 through the TFT 8 (not shown), and the bias line 9 is connected to the second electrode 7b of each thereof.

Then, an insulating layer 42 is formed above the photoelectric conversion element 7, the bias line 9, the TFT 8, the signal line 6 and the like, so as to coat these. Moreover, in this embodiment, a flattening layer is formed in order to flatten irregularities of a surface of the insulating layer 42, which are caused by the photoelectric conversion element 7 and the like. As the flattening layer, for example, there are used polycarbonate, polyacrylonitrile, polystyrene, a polyacrylic ester copolymer, polyvinyl alcohol, polymethacrylic acid, a polyvinyl chloride-vinyl acetate copolymer, polyethylene, a polyethylene-ethyl acetate copolymer, polyvinyl chloride, polyvinylidene chloride, polyvinyl acetate, polyester, polyamide, polyether, silicon, polybutadiene, a styrene-butadiene copolymer, ABS rubber, an acrylonitrile-butadiene copolymer, polyurethane, a silicon-acrylic copolymer, acrylic-modified fluorine resin, polyparaxylylene resin, polyimide resin, and the like. Among them, resin such as acrylic resin and polyimide resin is preferable.

Then, as shown in FIG. 11 and FIG. 12, further above the flattening layer 43, that is, between the sensor board 4 and the scintillator 3, a protection layer 44 that has an anti-static function is provided.

Note that, though the protection layer 44 and the flattening layer 43 are described as different layers in this embodiment, it is also possible to adopt a configuration, for example, in which the protection layer 44 and the flattening layer 43 are integrated with each other, that is, the irregularities of the surface of the insulating layer 42 are flattened by the protection layer 44. Moreover, it is also possible to form a layer other than the protection layer 44 and the flattening layer 43 between the photoelectric conversion element 7 and the scintillator 3, In this embodiment, the protection layer 44 is formed of such resin as below, which contains an anti-static agent, from a viewpoint of easiness to form the layer. For example, there are mentioned polycarbonate, polyacrylonitrile, polystyrene, a polyacrylic ester copolymer, polyvinyl alcohol, polymethacrylic acid, a polyvinyl chloride-vinyl acetate copolymer, polyethylene, a polyethylene-ethyl acetate copolymer, polyvinyl chloride, polyvinylidene chloride, polyvinyl acetate, polyester, polyamide, polyether, silicon, polybutadiene, a styrene-butadiene copolymer, ABS rubber, an acrylonitrile-butadiene copolymer, polyurethane, a silicon-acrylic copolymer, acrylic-modified fluorine resin, polyparaxylylene resin, polyimide resin, and the like. Among them, acrylic resin and polyimide resin are preferable, and from a viewpoint of heat resistance and light transmittance (that is, which allows transmission of the light to be outputted from the fluorescent material of the scintillator), transparent polyimide resin is most preferable, As the transparent polyimide, a transparent polyimide resin described in Japanese Patent Application Laid-open Publication No. 8-104750, or a transparent polyimide film described in Japanese Patent Application Laid-open Publication Nos. 8-3314 and 2012-144603 may be cited. When polyimide is used as the support body, linear thermal expansion coefficient of the transparent polyimide resin to be used as the protection layer is preferably 30 ppm or less in terms of heat resistance.

Moreover, preferably, a surface resistance value of the protection layer 44 ranges from $10^4$ to $10^{14}$ $[\Omega/m^2]$ Specifically, the anti-static function of the protection layer 44 is obtained by containing the anti-static agent in the resin. As the anti-static agent, for example, there can be mentioned carbon particles (carbon black, graphite, carbon fiber, carbon nanotube), oxide semiconductor particles (zinc oxide-based, tin oxide-based, indium oxide-based), surfactant (tetraalkyl ammonium salt, trialkyl benzyl ammonium salt, alkyl sulfonate salt, alkyl phosphate, glycerin fatty acid ester, polyoxy ethylene alkyl ether), hydrophilic polymers (sultanate, quaternary ammonium salt, a polyethylene glycol methacrylate copolymer, polyether ester amide, polyether amide imide, a polyethylene oxide-epichlorohydrin copolymer) conductive polymers (polyacetylene, polypyrrole, polythiophene, polyaniline, poly (3,4-dialkylpyrrole) poky (3,4-ethylenediox-ythiophene), poly (aniline sulfonic acid)), and the like.

Moreover, it is also possible to form the protection layer from only a material having an anti-static function, which is as described below. For example, there are mentioned surfactant (tetraalkyl ammonium salt, trialkyl benzyl ammonium salt, alkyl sulfonate salt, alkyl phosphate, glycerin fatty acid ester, polyoxy ethylene alkyl ether), hydrophilic polymers (sulfonate, quaternary ammonium salt, a polyethylene glycol methacrylate copolymer, polyether ester amide, polyether amide imide, a polyethylene oxide-epichlorohydrin copolymer), conductive polymers (polyacetylene, polypyrrole, polythiophene, polyaniline, poly (3,4-dialkylpyrrole) poly (3,4-ethylenedioxythiophene), poly (aniline sulfonic acid)), and the like.

Moreover, it is also possible to form the protection layer 44 from a conductive polymer such as a conductive sheet and a conductive adhesive, into which metal fine particles are mixed, a conductive oxide such as indium tin oxide (ITO) and indium zinc oxide (110), and the like.

Note that the protection layer 44, the flattening layer 43, the insulating layer 42 and the like are those which transmit therethrough the light to be irradiated from the scintillator 3 onto the photoelectric conversion elements and preferably, are transparent, Meanwhile, in this embodiment, as shown in FIG. 11 and FIG. 12, the above-mentioned scintillator 3 is composed of such columnar crystals of the fluorescent materials 3a, and is pasted onto the scintillator substrate 34, which is made of a glass substrate in this embodiment, through the above-mentioned reflection layer 3b, the support body (not shown) and the like.

Then, as shown in FIG. 1I, in a state where the surface (that is, the front surface 4a) of the sensor board 4, on which the photoelectric conversion elements 7 and the like are formed, and the surface of the scintillator substrate 34, onto which the scintillator 3 and the like are pasted, are opposite to each other, the sensor board 4 and the scintillator substrate 34 are pasted onto each other through an adhesive 45. In that event, in this embodiment, tip ends Pa of the fluorescent materials 3a of the scintillator 3 turn to a state of abutting against an upper surface of the above-mentioned protection layer 44.

Note that it is not necessary that the scintillator 3 be composed of the columnar crystals of the fluorescent materials 3a as described above, and for example, it is also possible to form the scintillator 3 by applying a paste-like fluorescent material on the scintillator substrate 34 or the reflection layer 3b.

In this embodiment, on the back surface 4b of the sensor board 4, that is, on the surface 4b on the opposite side with the side (front surface 4a) opposite to the scintillator 3, an anti-static layer 46 having conductivity or an anti-static function is provided.

In a similar way to the above-mentioned protection layer 44, this anti-static layer 46 may be formed of resin containing an anti-static agent, and moreover, it is also possible to form the anti-static layer 46 from a conductive polymer such as a conductive sheet and a conductive adhesive, into which metal fine particles are mixed, a conductive oxide such as ITO and IZO, and the like.

In this embodiment, preferably, a surface resistance value of the anti-static layer 46 ranges from $10^{-2}$ to $10^{14}$ $[\Omega/m^2]$. Then, in this embodiment, a lead thin plate 47, which inhibits the radiation from transmitting therethrough, a buffer material 48, the base stage 31 (refer to FIG. 2) and the like are provided further on a back surface side of the anti-static layer 46.

Note that, in the present invention, though it is essential to provide the anti-static layer 46 on the back surface 4b of the sensor board 4, it is possible to arbitrary select configurations of the lead thin plate 47, the buffer material 48, the base stage 31 and the like, which are other than the anti-static layer 46, an order of forming these, and the like. That is to say, in place of such an order as described above, it is also possible to compose the above-described components in such an order of the anti-static layer 46, the buffer material 48, the lead thin plate 47 and the base stage 31, and configurations and an order, which are necessary for the apparatus, are adopted as appropriate, Moreover, though not shown in FIG. 11, as mentioned above, the PCB board 33, on which the electronic components 32 and the like are arranged, the battery 24 (refer to FIG. 2) and the like are attached onto the back surface side of the base stage 31.

Next, a description is made of functions of the radiation image imaging apparatus 1 configured as described above.

As mentioned above, in the conventional radiation image imaging apparatus, when impacts and vibrations are applied to the radiation image imaging apparatus concerned from the outside in the event of the above-mentioned reading processing for the image data D, and the like, a relatively large noise is sometimes superimposed on the image data D, which are read out from the respective photoelectric conversion elements 7. Although a cause of such noise superimposition is not always clearly turned out, the cause is conceived to result from static electricity generated on the periphery of the sensor board 4.

For example, as shown in FIG. 11 and FIG. 12, in the radiation image imaging apparatus 1 configured as described above, the flattening layer 43, the protection layer 44, the scintillator 3 and the like exist between the reflection layer 3b composed of a metal layer or a resin layer containing metal particles and the second electrode 7b of each of the photoelectric conversion elements 7, and the radiation image imaging apparatus 1 can be regarded to be a capacitor-like one, which uses, as both electrodes, the reflection layer 3b and the second electrode 7b of each of the photoelectric conversion elements 7.

In this event, if the protection layer 44 having the anti-static function is not provided between the sensor board 4 and the scintillator 3 as in the conventional radiation image imaging apparatus, then static electricity generated in this portion, that is, positive and negative electric charges turn to a state, for example, where the positive electric charges (or the negative electric charges) gather in the vicinity of the reflection layer 3b, and the negative electric charges (or the positive electric charges) gather in the vicinity of the second electrode 7b of each of the photoelectric conversion elements 7

Then, when some impacts and vibrations are applied to the radiation image imaging apparatus in the event where the reading processing for the image data D is performed by discharging the electric charges to the signal line 6 through the TFT 8 (not shown in FIG. 11 and FIG. 12) from each of the photoelectric conversion elements 7 in this state, then the electric charges in the vicinity of the second electrode 7b of each of the photoelectric conversion elements 7 are superimposed on the electric charges to be read out from each of the photoelectric conversion elements 7, and accordingly, it can be conceived that the relatively large noise is superimposed on the image data D to be read out However, if the protection layer 44 is provided between the sensor board 4 and the scintillator 3 as in the radiation image imaging apparatus 1 according to this embodiment, then the protection layer 44 has the anti-static function, and accordingly, the generation of the static electricity in this portion is prevented.

Moreover, even if the static electricity is generated in this portion, the generated static electricity, that is, the positive and negative electric charges flow into the protection layer 44, and the positive electric charges (that is, holes) and the negative electric charges (that is, electrons) are recombined with each other and are removed. Moreover, even if the static electricity cannot be removed, the static electricity is at least diffused into the protection layer 44.

Therefore, the electric charges by the static electricity come not to build up in the vicinity of the reflection layer or the vicinity of the second electrode 7b of each of the photoelectric conversion elements 7. Accordingly, even if some impacts and vibrations are applied to the radiation image imaging apparatus 1 in the event of the reading processing for the image data D, the electric charges in the vicinity of the second electrode 7b of each of the photoelectric conversion elements 7 come not to be superimposed as described above on the electric charges to be read out from each of the photoelectric conversion elements 7. Therefore, it becomes possible to prevent at least the noise caused by the static electricity of this portion from being superimposed on the image data D to be read out.

However, this is a similar configuration to the configuration described in Japanese Patent Application Laid-Open Publication No. 2010-19620 mentioned above, and as mentioned above, in the researches of the inventors of the present invention, it is gradually understood that only such a configuration is sometimes insufficient for preventing an occurrence of a phenomenon that the noise is superimposed on the image data at least by the fact that the impacts and the vibrations are applied to the radiation image imaging apparatus Then, as a result that the inventors of the present invention progress the researches, as described above, it is understood that it is possible to effectively suppress the occurrence of the above-described phenomenon when the anti-static layer 46 having the conductivity or the anti-static function is provided on the back surface 4b of the sensor board 4, that is, on the surface 4b opposite with the side (front surface 4a) of the sensor board 4, which is opposite to the scintillator 3.

For example, if an air layer is formed in a portion of the anti-static layer 46 (that is, if a state where air is interposed between the back surface 4b of the sensor board 4 and the lead thin plate 47 is brought), then for example, negative electric charges are charged on the back surface 4b side of the sensor board 4 owing to friction and the like by the air. That is, static electricity is generated. Then, in response to the generation of the static electricity, for example, positive electric charges are charged on the front surface 4a side of the sensor board 4.

Then, in this state, when some impacts and vibrations are applied to the radiation image imaging apparatus in the event where the reading processing for the image data D from each of the photoelectric conversion elements 7 is performed, then, for example, the positive electric charges on the front surface 4a side of the sensor board 4 flow in from the first electrode 7a (refer to FIG. 12) of each of the photoelectric conversion elements 7, and so on, and are thereby superimposed on the electric charges to be read out from each of the photoelectric conversion elements 7. Therefore, it is possible to conceive that the relatively large noise is superimposed on the image data D to be read out, It is known that this phenomenon occurs even if the air layer in the portion of the anti-static layer 46 is replaced, for example, by a sponge-like buffer material made of resin, or by an insulating layer made of resin or the like. That is to say, it is conceived that, as long as a layer that does not have conductivity, such as the air layer and the insulating layer, is provided on the back surface 4b side of the sensor board 4, the static electricity is generated on the back surface 4b side of the sensor board, and owing to this static electricity, the relatively large noise is superimposed on the image data D to be read out.

Meanwhile, if the anti-static layer 46 (refer to FIG. 11) having the conductivity or the anti-static function is provided on the back surface 4b of the sensor board 4 as in the radiation image imaging apparatus 1 according to this embodiment, then it becomes possible to accurately prevent, the static electricity from being generated on the back surface 4b side of the sensor board 4. Moreover, even if the static electricity is generated, then the static electricity, that is, the positive and negative electric charges are recombined with each other and removed in the anti-static layer 46, or the static electricity is at least diffused into the anti-static layer 46. Accordingly, the electric charges come not to build up on the back surface 4b side of the sensor board 4.

Therefore, in response to the above-described effect, the electric charges are suppressed from building up on the front surface 4a side of the sensor board 4, or flow into the protection layer 44 as described above even if the electric charges are generated. Accordingly, even if the impacts and the vibrations are applied to the radiation image imaging apparatus 1 in the event of the reading processing for the image data D, the electric charges in the vicinity of the first electrode 7a of each of the photoelectric conversion elements 7 come not to be superimposed as described above on the electric charges to be read out from each of the photoelectric conversion elements 7. Therefore, it becomes possible to present the noise, which is caused by the static electricity, from being superimposed on the image data D to be read out.

For example, though the lead thin plate 47 is provided immediately under the anti-static layer 46 as shown in FIG. 11 in this embodiment, the anti-static layer 46 functions in a similar way even if the lead thin plate 47 is not provided, and for example, the sponge-like buffer material 48 made of resin is immediately under the anti-static layer 46 concerned.

Moreover, in the case where the static electricity is diffused into the anti-static layer 46 if the lead thin plate 47 is provided immediately under the anti-static layer 46, then the static electricity also flows through an inside of the lead thin plate 47, and diffusion efficiency of the static electricity is enhanced. Therefore, it becomes possible to more accurately prevent an adverse effect from occurring owing to the static electricity as described above.

As described above, in accordance with the radiation image imaging apparatus 1 according to this embodiment, the protection layer 44 having the anti-static function is provided between the sensor board 4 and the scintillator 3, and further, on the back surface 4b of the sensor board 4, that is, on the surface 4b of the sensor board 4, which is opposite with the side facing the scintillator 3, the anti-static layer 46 having the conductivity or the anti-static function is provided, whereby it becomes possible to accurately prevent the static electricity from being generated on the periphery of the sensor board 4 and to effectively remove the static electricity even if the static electricity is generated.

Therefore, even if the impacts and the vibrations are applied from the out to the radiation image imaging apparatus 1 in the event of the reading processing for the image data D from each of the photoelectric conversion elements 7, it becomes possible to accurately prevent the static electricity from being mixed into the electric charges to be read out from each of the photoelectric conversion elements 7, and it becomes possible to accurately prevent the noise, which is caused by the impacts and the vibrations, from being superimposed on the image data D to be read out Note that it is understood that the adverse effect, which is caused by the fact that the static electricity is mixed into the signal in such a manner that the impacts and the vibrations are applied from the outside to the radiation image imaging apparatus 1, is not only generated in the event of the reading processing for the image data D, which is as described above, but can also be given to other scenes of the respective pieces of processing in the radiation image imaging apparatus 1.

For example, the reading processing for the image data D from each of the photoelectric conversion elements 7 is performed after the radiation is irradiated onto the radiation image imaging apparatus 1, and the read out image data. D contains an amount of offset caused by so-called dark electric charges (also referred to as a dark current) which are always generated by thermal excitation by heat (temperature) of each of the photoelectric conversion elements 7, and the like.

Then, reading processing for offset data O, which reads the amount of offset by the dark electric charges as the offset data O concerned, is sometimes performed before or after the above-described reading processing for the image data D. Then, the reading processing for the offset data O is performed in a similar way to the above-described reading processing for the image data. D except that the reading processing for the offset data O is performed in a state where the radiation is not irradiated onto the radiation image imaging apparatus 1.

Therefore, also in the event of the reading processing for the offset data O, the impacts and the vibrations are applied from the outside to the radiation image imaging apparatus 1, whereby the noise caused by the static electricity is superimposed on the offset data O, and such a phenomenon that the offset data O becomes an extraordinarily large value can occur. However, the radiation image imaging apparatus 1 is configured as in the present invention, whereby it becomes possible to accurately prevent the noise, which is caused by the impacts and the vibrations, from being superimposed on the offset data, which is to be read out, even if the impacts and the vibrations are applied to the radiation image imaging apparatus 1.

Moreover, though not shown, the conventional radiation image imaging apparatus has been configured so as to perform the radiation image imaging in cooperation with the radiation generation apparatus including the radiation source, which irradiates the radiation onto the radiation image imaging apparatus concerned, while transmitting and receiving a signal and the like to and from the radiation generation apparatus. However, in recent years, there has been progressed development of a technology for allowing the radiation image imaging apparatus itself to detect that the irradiation of the radiation is started without allowing the radiation image imaging apparatus to be in cooperation with the radiation generation apparatus.

Then, the following is gradually understood. Also in the case where the radiation image imaging apparatus is configured so as to detect by itself that the irradiation of the radiation is started, when the static electricity is generated on the periphery of the sensor board in the event of detection processing for the irradiation start of the radiation, the irradiation start of the radiation can be erroneously detected in the case where the impacts and the vibrations are applied to the radiation image imaging apparatus As methods for allowing the radiation image imaging apparatus to detect the irradiation start of the radiation by itself a variety of methods are developed, and a description is made below of two methods among them.

[Detection Method 1]

Figure 13:
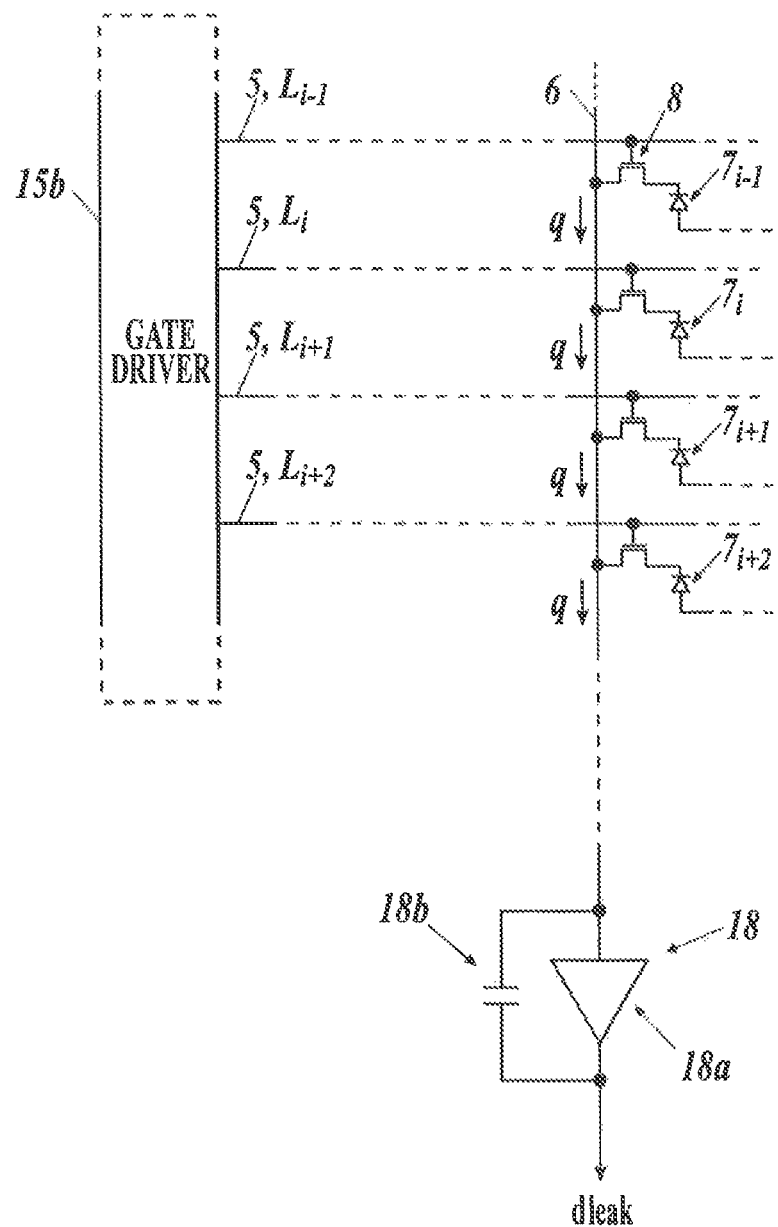
FIG. 13 is a view explaining that each electric charge that leaks from each photoelectric conversion element through the TFT is read out as leak data.

For example, it is also possible to adopt a configuration so that reading processing for leak data dleak can be repeatedly performed before the radiation is irradiated onto the radiation image imaging apparatus 1 in the radiation image imaging. Here, as shown in FIG. 13, the leak data dleak is data equivalent to a total value of electric charges q, which leak from the respective photoelectric conversion elements 7 through the respective OFF-state TFTs 8 in a state where the OFF voltage is applied to the respective scan lines 5, for each of the signal lines 6.

Figure 14:
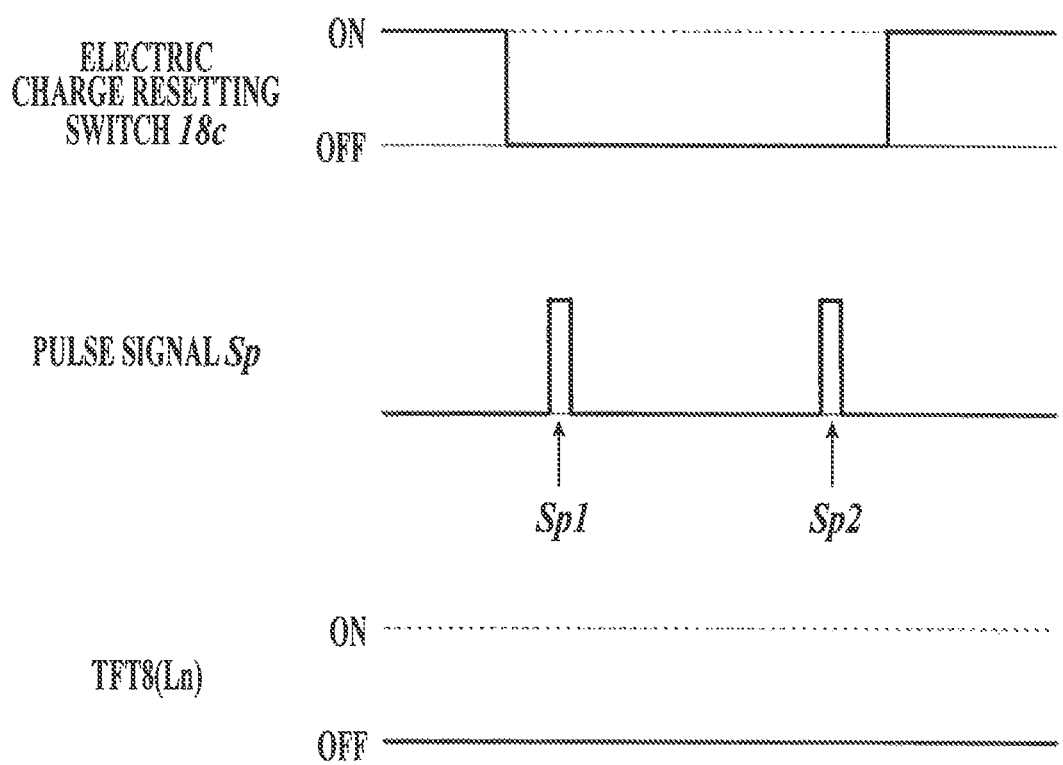
FIG. 14 is a timing chart showing ON/OFF timing of the electric charge resetting switch and the TFT in reading processing for the leak data.

Then, unlike in the case of the reset processing for the respective photoelectric conversion elements 7, which is shown in FIG. 9, and the case of the reading processing for the image data D, which is shown in FIG. 10, in the reading processing for the leak data dleak, as shown in FIG. 14, the pulse signals Sp1 and Sp2 are transmitted from the control unit 22 to the correlated double sampling circuits 19 (refer to CDS in FIG. 7 and FIG. 8) of the respecting reading circuits 17 in a state where the respective TFTs 8 are turned to the OFF state by applying the OFF voltage to the respective lines L1 to Lx of the scan lines 5.

When the pulse signal Sp1 is transmitted from the control unit 22 to each of the correlated double sampling circuits 19, the correlated double sampling circuit 19 holds the voltage value Vin that is being outputted from the amplifier circuit 18 at that point of time. Then, when the electric charges q, which leak from the respective photoelectric conversion elements 7 through the respective TFTs 8, are accumulated in the capacitor 18b of the amplifier circuit 18, the voltage value to be outputted from the amplifier circuit 18 rises, and the pulse signal Sp2 is transmitted from the control unit 22, the correlated double sampling circuit 19 holds the voltage value Vfi that is being, outputted from the amplifier circuit 18 at that point of time Then, a value, which is obtained in such a manner that the correlated double sampling circuit 19 calculates the voltage value difference Vfi-Vin and is outputted thereby, becomes the leak data dleak. Thereafter, the leak data dleak is also converted into a digital value by the A/D converter 20 in a similar way to the case of the above-mentioned reading processing for the image data D.

Incidentally, if such a configuration is adopted so that only the reading processing for the leak data dleak can be repeatedly performed, then the respective TFTs 8 are left in the OFF state, and the dark electric charges generated in the respective photoelectric conversion elements 7 continue to be accumulated in the respective photoelectric conversion elements 7

Figure 15:
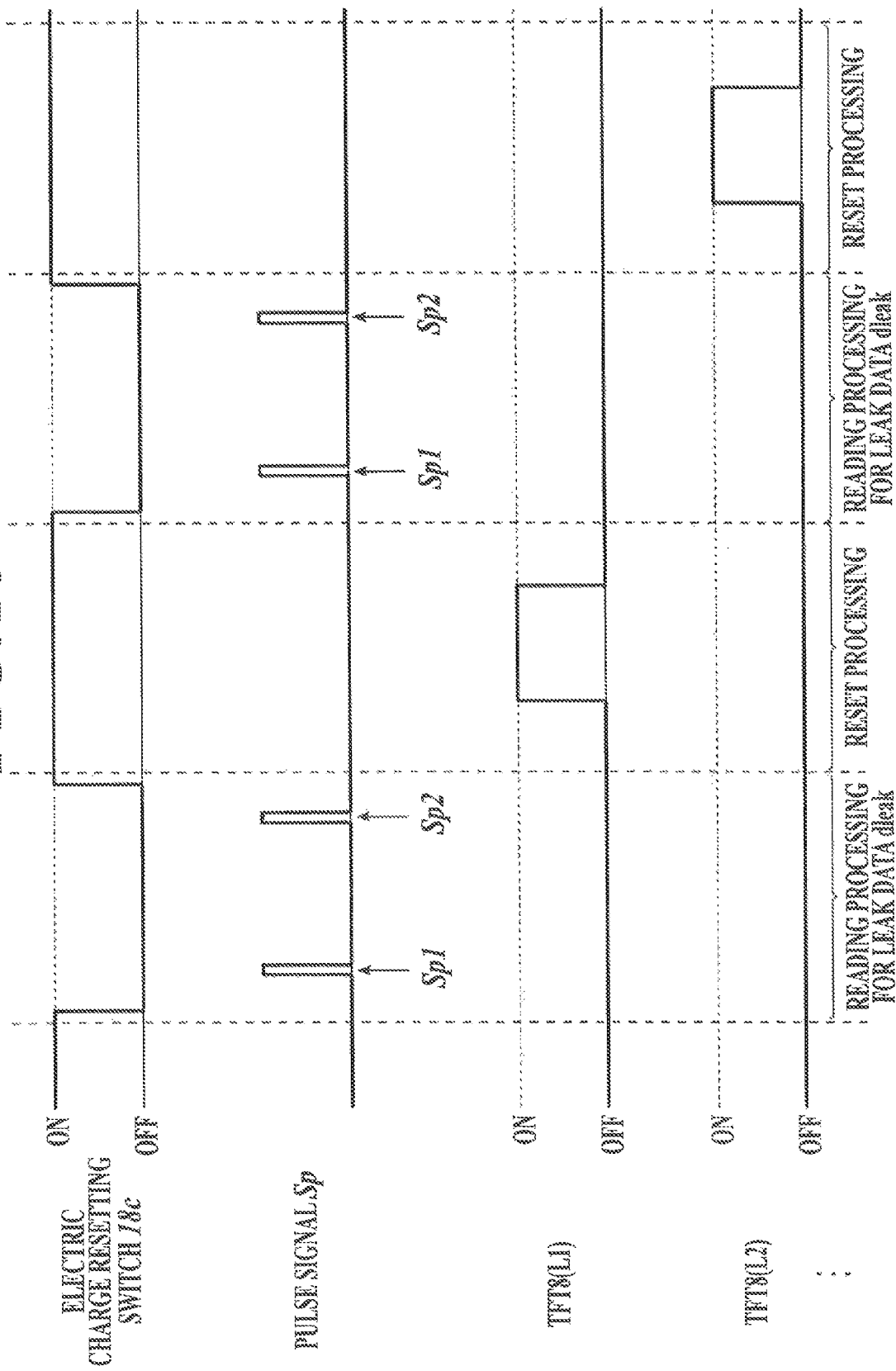
FIG. 15 is a timing chart showing ON/OFF timing of the electric charge resetting switch, the pulse signal and the TFT in a case where a configuration is adopted so that the reading processing for the leak data and the reset processing for each photoelectric conversion element can be alternately performed before radiation image imaging.

Therefore, in the case of adopting the configuration so that the reading processing for the leak data dleak can be repeatedly performed before the radiation image imaging as described above, then as shown in FIG. 15, desirably, such a configuration is adopted so that the reading processing for the leak data dleak, which is to be performed in a state where the OFF voltage is applied to the respective scan lines 5, and the reset processing for the respective photoelectric conversion elements 7, which is to be performed by sequentially applying the ON voltage to the respective lines L1 to Lx of the scan lines 5, can be performed alternately and repeatedly.

In the case of adopting the configuration so that the reading processing for the leak data dleak can be repeatedly performed before the radiation image imaging as described above, when the irradiation of the radiation onto the radiation image imaging apparatus 1 is started, the light converted from the radiation by the scintillator 3 (refer to FIG. 2) is irradiated onto the respective TFTs 8. Then, in such a way, the electric charges q (refer to FIG. 15), which leak from the respective photoelectric conversion elements 7 through the respective TFTs 8, are individually increased.

Figure 16:
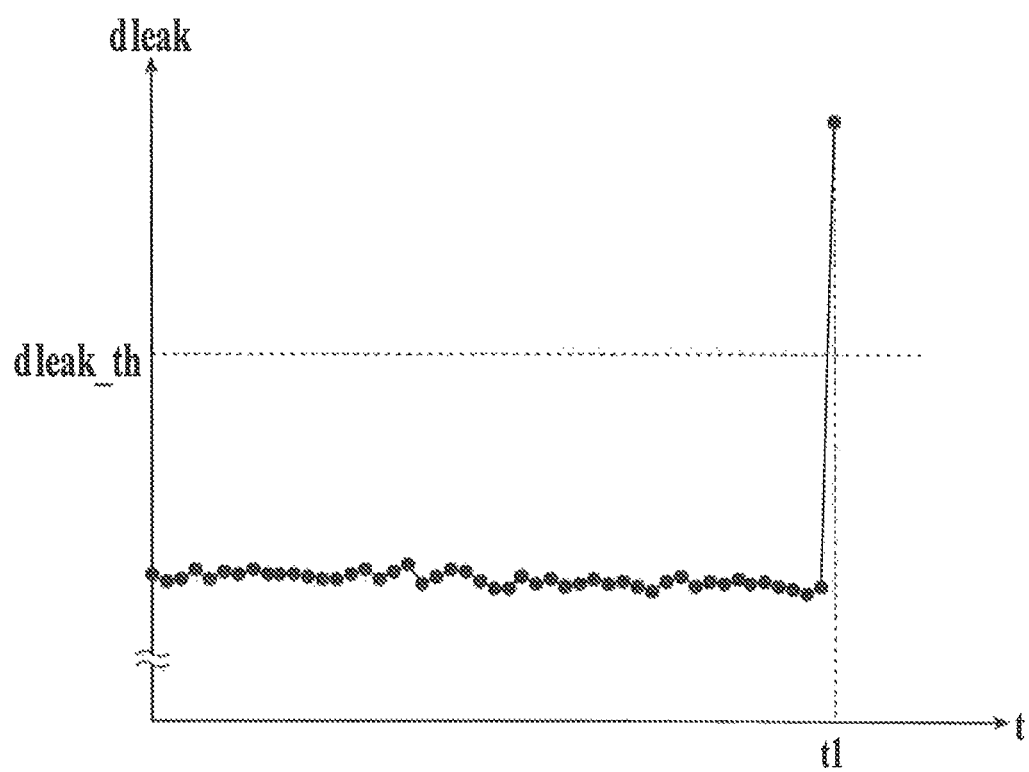
FIG. 16 is a graph showing an example of a time shift of the leak data to be read out.

Therefore, it is understood that, as shown in FIG. 16, the leak data dleak, which is read out at the point of time (refer to a time t1 in FIG. 16) when the irradiation of the radiation onto the radiation image imaging apparatus 1 is started, has a value remarkably larger than that of the leak data dleak read out before the time t1 concerned.

Accordingly, it becomes possible to adopt a configuration so that the leak data dleak, which is read out in the reading processing for the leak data dleak before the radiation image imaging, can be monitored by the control unit 22 of the radiation image imaging apparatus 1, and to adopt a configuration so that it can be detected that the irradiation of the radiation is started, for example, at the point of time when the read out leak data dleak exceeds a predetermined threshold value dleak_th (refer to FIG. 16), which is preset.

[Detection Method 2]

Moreover, in place of adopting the configuration so that the reading processing for the leak data dleak can be performed before the radiation image imaging as in the above-described detection method 1, it is possible to adopt a configuration so that reading processing for image data d from the respective photoelectric conversion elements 7 can be repeatedly performed before the radiation image imaging in a similar way to the above-described reading processing for the image data D.

Note that, as mentioned above, in distinction from the image data D as the above-described main image obtained after the imaging, such image data to be read out for detecting the start of the radiation irradiation before the radiation image imaging is hereinafter referred to as the image data d for detecting the start of the irradiation (irradiation start detecting image data d).

In the reading processing for the irradiation start detecting image data d, the ON/OFF of the electric charge resetting switch 18c of the amplifier circuit 18 of the reading circuit 17, the transmission of the pulse signals Sp1 and Sp2 to the correlated double sampling circuit 19, and the like are performed in a similar way to the processing in the reading processing for the image data ID, which is shown in FIG. 10.

In the case of adopting the configuration so that the reading processing for the irradiation start detecting image data d can be performed before the radiation image imaging as described above, then in a similar way to the case of the above-described detection method 1 (refer to FIG. 16), when the irradiation of the radiation onto the radiation image imaging apparatus 1 is started, the irradiation start detecting image data d read out at that point of time has a value remarkably larger than the irradiation start detecting image data d read out before the point of time concerned.

Accordingly, also in this case, it becomes possible to adopt such a configuration so that the irradiation start detecting image data d, which is read out in the reading processing before the radiation image imaging, can be monitored by the control unit 22 of the radiation image imaging apparatus 1, and to adopt such a configuration so that it can be detected that the irradiation of the radiation is started at the point of time when the read out irradiation start detecting image data d exceeds a predetermined threshold value dth, which is preset.

In the case of adopting such configurations so that the start of the radiation irradiation can be detected by the radiation image imaging apparatus 1, for example, by using the detection method 1 and the detection method 2 as described above, unless the static electricity can be prevented from being generated on the periphery of the sensor board 4, the generated static electricity can be accurately removed, and so on, relatively large noises can be superimposed on the leak data dleak to be read out and the irradiation start detecting image data d when the impacts and the vibrations are applied to the radiation image imaging apparatus 1.

Therefore, though the radiation is not irradiated onto the radiation image imaging apparatus 1, when the impacts and the like are applied to the radiation image imaging apparatus 1, the noises are superimposed on the leak data dleak and the irradiation start detecting image data d, and in some case, the leak data dleak and the irradiation start detecting image data d can exceed the threshold value dleak_th and the threshold value dth.

Then, when the leak data dleak and the irradiation start detecting image data d exceed the threshold value dleak_th and the threshold value dth, the control unit 22 of the radiation image imaging apparatus 1 erroneously detects that the irradiation of the radiation is started though the radiation is not irradiated onto the radiation image imaging apparatus 1.

However, in accordance with the radiation image imaging apparatus 1 according to this embodiment, as described above, the protection layer 44 having the anti-static function is provided between the sensor board 4 and the scintillator 3, and further, on the back surface 4b of the sensor board 4, that is, on the surface 4b of the sensor board 4, which is opposite with the surface thereof facing the scintillator 3, the anti-static layer 46 having the conductivity or the anti-static function is provided, whereby it becomes possible to accurately prevent the static electricity from being generated on the periphery of the sensor board 4, and to effectively remove the static electricity even if the static electricity concerned is generated.

Therefore, even if the impacts and the vibrations are applied to the radiation image imaging apparatus 1, the noises caused by the static electricity can be accurately prevented from being superimposed on the leak data dleak and the irradiation start detecting image data d, which are to be read out before the radiation image imaging, and if the radiation is not irradiated onto the radiation image imaging apparatus 1, the leak data dleak and the irradiation start detecting image data d, which are to be read out, can be prevented from exceeding the threshold value dleak_th and the threshold value dth.

Therefore, in accordance with the present invention, even if the impacts and the vibrations are applied to the radiation image imaging apparatus 1 in the case of adopting the configuration so that the start of the radiation irradiation can be detected by the radiation image imaging apparatus 1 itself, the erroneous detection of the start of the radiation irradiation can be accurately prevented from occurring by the application of the impacts and the vibrations.

According to a preferred embodiment of the present invention, there is provided a radiation image imaging apparatus, including:

a sensor board, including a plurality of scan lines, a plurality of signal lines and a plurality of photoelectric conversion elements, the plurality of scan lines and the plurality of signal lines being arranged to intersect each other, and the plurality of photoelectric conversion elements being arranged two-dimensionally in respective small regions partitioned by the plurality of scan lines and the plurality of signal lines;

a scintillator which converts an incident radiation into light and irradiates the light onto the photoelectric conversion elements;

a scan drive unit which sequentially applies an ON voltage to the respective scan lines while switching the respective scan lines to be applied with the ON voltage;

switch units which are connected to the respective scan lines, accumulate electric charges in the photoelectric conversion elements upon being applied with an OFF voltage, and discharge the electric charges to the signal lines upon being applied with the ON voltage, the electric charges being accumulated in the photoelectric conversion elements;

a reading circuit which is connected to the signal lines, coverts the electric charges into image data, the electric charges being discharged from the photoelectric conversion elements, and reads out the image data; and a control unit which controls at least the scan drive unit and the reading circuit to perform reading processing for the image data from the photoelectric conversion elements, and a protection layer having an anti-static function is provided between the sensor board and the scintillator, and an anti-static layer having conductivity or an anti-static function is provided on a surface of the sensor board, the surface being opposite with a side facing the scintillator.

Preferably, the anti-static layer is formed of a conductive polymer or resin containing an anti-static agent.

Preferably, a surface resistance value of the anti-static layer ranges from $10^{-2}$ to $10^{14}$ [$\Omega/m^2$].

Preferably, the protection layer is formed of a conductive polymer or resin containing an anti-static agent.

Preferably, a surface resistance value of the protection layer ranges from $10^4$ to $10^{14}$ [$\Omega/m^2$].

Preferably, the protection layer is composed by overlapping a plurality of layers.

Preferably, at least one layer of the plurality of layers of the protection layer is formed of polyimide resin, Preferably, before radiation image imaging, the control unit allows the reading circuit to perform a reading operation in a state where the respective switch units are turned to an OFF state by applying the OFF voltage from the scan drive unit to all of the scan lines, and to repeatedly perform leak data reading processing which converts electric charges into leak data, the electric charges having leaked from the photoelectric conversion elements through the switch units, and based on the read out leak data, detects that irradiation of the radiation is started.

Preferably, before radiation image imaging, the control unit controls at least the scan drive unit and the reading circuit to repeatedly perform the reading processing for irradiation start detecting image data from the photoelectric conversion elements, and based on the read out irradiation start detecting image data, detects that irradiation of the radiation is started.

Note that it is needless to say that the present invention is not limited to the above-described embodiment and modification examples thereof and is appropriately changeable within the scope without departing from the spirit of the present invention.

What is claimed is:

1. A radiation image imaging apparatus comprising:

a sensor board, including a plurality of scan lines, a plurality of signal lines and a plurality of photoelectric conversion elements, the plurality of scan lines and the plurality of signal lines being arranged to intersect each other, and the plurality of photoelectric conversion elements being arranged two-dimensionally in respective small regions partitioned by the plurality of scan lines and the plurality of signal lines;

a scintillator which converts an incident radiation into light and irradiates the light onto the photoelectric conversion elements;

a scan drive unit which sequentially applies an ON voltage to the respective scan lines while switching the respective scan lines to be applied with the ON voltage;

switch units which are connected to the respective scan lines, accumulate electric charges in the photoelectric conversion elements upon being applied with an OFF voltage, and discharge the electric charges to the signal lines upon being applied with the ON voltage, the electric charges being accumulated in the photoelectric conversion elements;

a reading circuit which is connected to the signal lines, coverts the electric charges into image data, the electric charges being discharged from the photoelectric conversion elements, and reads out the image data; and a control unit which controls at least the scan drive unit and the reading circuit to perform reading processing for the image data from the photoelectric conversion elements, wherein a protection layer having an anti-static function is provided between the sensor board and the scintillator, and an anti-static layer having conductivity or an anti-static function is provided on a surface of the sensor board, the surface being opposite a side of the sensor board facing the scintillator.

2. The radiation image imaging apparatus according to claim 1, wherein the anti-static layer is formed of a conductive polymer or resin containing an anti-static agent.

3. The radiation image imaging apparatus according to claim 1, wherein a surface resistance value of the anti-static layer ranges from $10^{-2}$ to $10^{14}$ [$\Omega/m^2$].

4. The radiation image imaging apparatus according to claim 1, wherein the protection layer is formed of a conductive polymer or resin containing an anti-static agent.

5. The radiation image imaging apparatus according to claim 1, wherein a surface resistance value of the protection layer ranges from $10^4$ to $10^{14}$ [$\Omega/m^2$].

6. The radiation image imaging apparatus according to claim 1, wherein the protection layer is composed by overlapping a plurality of layers.

7. The radiation image imaging apparatus according to claim 6, wherein at least one layer of the plurality of layers of the protection layer is formed of polyimide resin.

8. The radiation image imaging apparatus according to claim 1, wherein, before radiation image imaging, the control unit allows the reading circuit to perform a reading operation in a state where the respective switch units are turned to an OFF state by applying the OFF voltage from the scan drive unit to all of the scan lines, and to repeatedly perform leak data reading processing which converts electric charges into leak data, the electric charges having leaked from the photoelectric conversion elements through the switch units, and based on the read out leak data, detects that irradiation of the radiation is started.

9. The radiation image imaging apparatus according to claim 1, wherein, before radiation image imaging, the control unit controls at least the scan drive unit and the reading circuit to repeatedly perform the reading processing for irradiation start detecting image data from the photoelectric conversion elements, and based on the read out irradiation start detecting image data, detects that irradiation of the radiation is started.

* * * * *